United States Patent
Strandberg

(10) Patent No.: US 10,761,695 B1
(45) Date of Patent: Sep. 1, 2020

(54) REMOTELY CONTROLLING VEHICLE TOUCHSCREEN CONTROLS

(71) Applicant: Volvo Car Corporation, Gothenburg (SE)

(72) Inventor: Mats Strandberg, Göteborg (SE)

(73) Assignee: VOLVO CAR CORPORATION, Gothenburg (SE)

(*) Notice: Subject to any disclaimer, the term of this patent is extended or adjusted under 35 U.S.C. 154(b) by 0 days.

(21) Appl. No.: 16/272,797

(22) Filed: Feb. 11, 2019

(51) Int. Cl.
G06F 3/048 (2013.01)
G06F 3/0484 (2013.01)
G06F 3/0488 (2013.01)
G06F 3/14 (2006.01)
B60K 35/00 (2006.01)

(52) U.S. Cl.
CPC ............ G06F 3/0484 (2013.01); B60K 35/00 (2013.01); G06F 3/0488 (2013.01); G06F 3/1454 (2013.01); *B60K 2370/11* (2019.05); *B60K 2370/55* (2019.05); *B60K 2370/73* (2019.05)

(58) Field of Classification Search
CPC .... G06F 3/0484; G06F 3/0488; G06F 3/1454; B60K 35/00; B60K 2370/11; B60K 2370/73; B60K 2370/55
USPC ......................................................... 715/740
See application file for complete search history.

(56) References Cited

U.S. PATENT DOCUMENTS

| | | |
|---|---|---|
| 8,078,359 B2 | 12/2011 | Small et al. |
| 8,989,961 B2 | 3/2015 | Chien |
| 9,294,798 B2 * | 3/2016 | Sim ..................... H04N 21/4122 |
| 9,348,492 B1 | 5/2016 | Penilla et al. |
| 9,430,476 B2 * | 8/2016 | Bai ........................ G06F 16/435 |
| 9,584,979 B2 * | 2/2017 | Nathwani ............... H04W 4/20 |
| 9,958,289 B2 * | 5/2018 | Foster ................ G01C 21/3688 |
| 9,992,319 B2 * | 6/2018 | Yoon .................... H04M 1/7253 |
| 10,054,463 B2 * | 8/2018 | Foster ................ G01C 21/3626 |
| 10,089,053 B2 * | 10/2018 | Gerlach .............. G06F 3/04817 |
| 10,394,375 B2 * | 8/2019 | Olien ...................... G06F 3/041 |
| 2014/0163774 A1 * | 6/2014 | Demeniuk ............. G08C 17/02 701/2 |
| 2014/0277937 A1 * | 9/2014 | Scholz ...................... G06F 7/00 701/36 |
| 2016/0267335 A1 | 9/2016 | Hampiholi |
| 2016/0294605 A1 * | 10/2016 | Searle ................... H04L 41/082 |
| 2016/0294614 A1 * | 10/2016 | Searle ..................... H04L 67/34 |
| 2018/0005254 A1 * | 1/2018 | Bai ..................... G06Q 30/0203 |

(Continued)

*Primary Examiner* — David Phantana-angkool
(74) *Attorney, Agent, or Firm* — Amin, Turocy & Watson, LLP

(57) ABSTRACT

Techniques are described that facilitate remotely interfacing with a vehicle touchscreen. According to an embodiment, a method is provided comprising determining touch controls included in a GUI configured for displaying on a touchscreen of the vehicle, wherein the touch controls provide for controlling functions of the vehicle based on first interaction with the touch controls as displayed on the touchscreen. The method further comprises generating a representation of the GUI for display via an auxiliary display of the auxiliary device, the representation comprising one or more graphical controls corresponding to one or more touch controls of the touch controls, and enabling remote control of one or more functions of the functions of the vehicle by the auxiliary device based on second interaction with the one or more graphical controls as displayed via the auxiliary display.

25 Claims, 12 Drawing Sheets

(56) References Cited

U.S. PATENT DOCUMENTS

2018/0096605 A1\* 4/2018 Bai .................... B60K 35/00
2019/0206151 A1\* 7/2019 Zucconelli ............. G07C 5/08

\* cited by examiner

REMOTELY CONTROLLING VEHICLE TOUCHSCREEN CONTROLS

TECHNICAL FIELD

Embodiments disclosed and claimed herein relate to vehicle touchscreens and techniques that facilitate remotely controlling vehicle functions and applications accessed by touch controls displayed on a vehicle touchscreen using mirrored touch controls rendered at an auxiliary device.

BACKGROUND

Many individuals have become accustomed to interacting with their electronic devices by a simple swipe or touch of a finger due to the rapid increase in smartphone and tablet use. As a result, automobile manufacturers are turning to touchscreen technology for a variety of applications. For example, many vehicles are being implemented with touchscreens that provide touch controls to control different functions in the vehicle, including the infotainment systems, the heating, ventilation, and air conditioning (HVAC) controls, the navigation system, the backup camera and various settings. In this regard, electromechanical buttons and knobs are being replaced with functionality and advanced applications that are accessed and controlled via touchscreens. However, most modern vehicles integrate a primary touchscreen for interacting with and controlling vehicle functions and applications in a center stack of a vehicle dashboard limiting access to front seat occupants. As result, passengers seated in rear seats of the vehicle cannot reach and access the touchscreen.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate remotely controlling vehicle functions and applications accessed by touch controls displayed on a vehicle touchscreen using mirrored touch controls rendered at an auxiliary device.

According to one or more embodiments, an auxiliary device that facilitates remotely controlling functions of a vehicle is provided. The auxiliary device can comprise a display and a processor that executes computer executable components stored in at least one memory. The computer executable component can include a session activation component that facilitates establishing a secure connection between the auxiliary device and an onboard computing system of the vehicle, and an interface acquisition component that determines touch controls included in a graphical user interface (GUI) configured for displaying on a touchscreen of the vehicle, wherein the touch controls provide for controlling functions of the vehicle based on first interaction with the touch controls as displayed on the touchscreen. The computer executable components can further comprise a display control component that controls display of a representation of the graphical user interface via the display of the auxiliary device, the representation comprising one or more graphical controls corresponding to one or more touch controls of the touch controls, and a remote-control component that provides for remotely controlling one or more functions of the functions of the vehicle based on second interaction with the one or more graphical controls as displayed via the display.

In some implementations, the representation of the graphical user interface mirrors the graphical user interface. For example, in one or more embodiments, the interface acquisition component determines a current representation of the graphical user interface displayed on the touchscreen, and wherein the representation of the graphical user interface mirrors the current representation. In some implementations, wherein the connection comprises a wireless connection and wherein the remote-control component enables the remote control based on establishment of the connection between the auxiliary device and the onboard computing system. For example, the onboard computing system can comprise a remote-control unit that controls execution of the one or more functions and wherein the remote-control component directs the remote-control unit to execute the one or more functions in response to the second interaction with the one or more graphical controls as displayed via the display.

In some implementations, the display control component can select the one or more graphical controls based on usage privileges granted to the auxiliary device or a user of the auxiliary device, a context of the vehicle and/or a location of the auxiliary device relative to the vehicle. The auxiliary device can also include a machine learning component that learns behavior of a user of the auxiliary device in association with usage of the representation of the graphical user interface to remotely control the one or more function and modifies the one or more graphical controls based on the behavior.

One or more additional embodiments are directed to a computer program product that facilitates remotely controlling functions of a vehicle, the computer program product comprising readable storage medium having program instructions embodied therewith. The program instructions can be executable by a processor to cause the processor to perform actions, including determining touch controls included in a graphical user interface configured for displaying on a touchscreen of the vehicle, wherein the touch controls provide for controlling the functions of the vehicle based on first interaction with the touch controls as displayed on the touchscreen. The actions can further include generating a representation of the graphical user interface for display via an auxiliary display of an auxiliary device, the representation comprising one or more graphical controls corresponding to one or more touch controls of the touch controls, and enabling remote control of one or more functions of the functions of the vehicle by the auxiliary device based on second interaction with the one or more graphical controls as displayed via the auxiliary display.

Another embodiment is directed to a system located on or within a vehicle, the system comprising a touchscreen that displays a graphical user interface comprising touch controls that control functions of the vehicle, and a processor that executes computer executable components stored in at least one memory. The components can include a session activation component that facilitates establishing a secure connection between the system and one or more auxiliary devices, and a remote-control unit that enables, based on establishment of the secure connection, remote control of one or more functions of the functions of the vehicle by the one or more auxiliary devices based on interaction with a representation of the graphical user interface rendered at the one or more auxiliary devices, wherein the representation comprises one or more touch controls of the touch controls. In various implementations, the representation of the graphical user interface mirrors the graphical user interface.

In some implementations, the system further comprises a privileges configuration component of the remote-control unit that facilitates defining usage privileges for enabling the remote control of the one or more functions by the one or more auxiliary devices. The system can also comprise a control management component of the remote-control unit that controls activating and deactivating remote control of the one or more vehicle functions by one or more auxiliary devices. In addition, in some implementations, the one or more auxiliary devices comprise at least two auxiliary devices, and the system further comprises a conflict resolution component of the remote-control unit that resolves conflicting control commands for remotely controlling a function of the one or more functions, the conflicting control commands being received from the at least two auxiliary devices at or near a same time.

In some embodiments, elements described in connection with the disclosed systems can be embodied in different forms such as a computer-implemented method, a computer program product, or another form.

DETAILED DESCRIPTION

Figure 1:
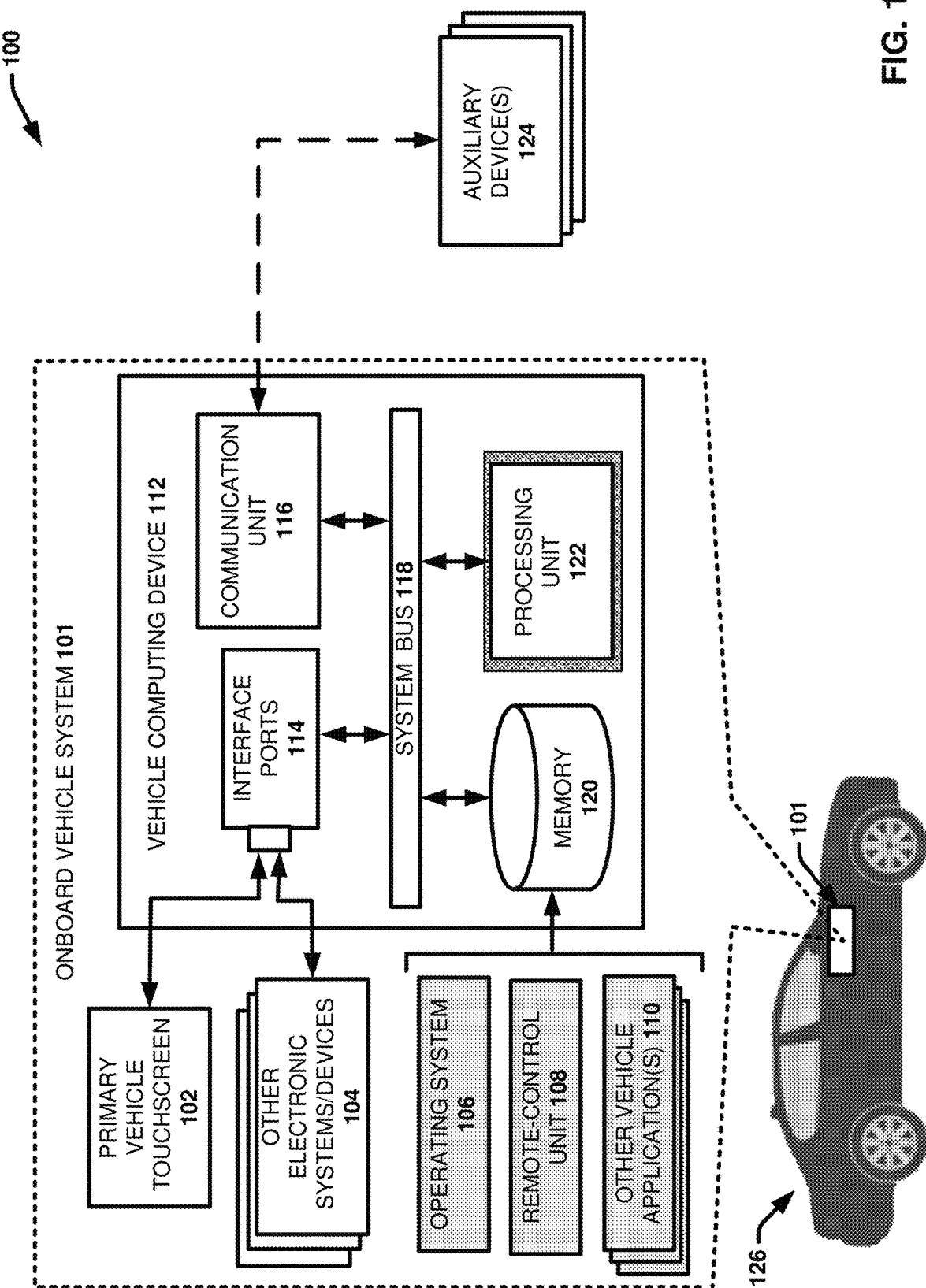
FIG. 1 illustrates a block diagram of an example, non-limiting system that facilitates remotely controlling vehicle functions and applications accessed by touch controls displayed on a vehicle touchscreen using mirrored touch controls rendered at an auxiliary device in accordance with one or more embodiments described herein.

The following detailed description is merely illustrative and is not intended to limit, claims, embodiments and/or application or uses of embodiments. Furthermore, there is no intention to be bound by any expressed or implied information presented in the preceding Summary section or in the Detailed Description section.

One or more embodiments described herein is directed to remotely controlling vehicle functions accessed by touch controls displayed on a vehicle touchscreen using corresponding touch controls rendered at an auxiliary device. In particular, many modern vehicles integrate a primary touchscreen for interacting with and controlling vehicle functions and applications in the center stack of the vehicle dashboard. As result, passengers seated in rear seats of the vehicle cannot reach and access the touchscreen. The disclosed techniques provide for extending features and functionalities provided by a primary vehicle touchscreen to one or more external or auxiliary devices (e.g., personal computing devices operated by the other passengers (e.g., smartphones, tablet personal computers, etc.)) that are accessible to one or more passengers in the vehicle. For example, in various embodiments, the GUI and/or a representation of the GUI that is displayed and/or accessed on the primary vehicle touchscreen can be displayed on an auxiliary device. As used herein, an "auxiliary device" can be a device other than the primary vehicle touchscreen. The auxiliary device can further be operatively and communicatively coupled to the vehicle computing system/device (e.g., via a wireless communication link) that runs and executes the vehicle functions and applications and can be granted authorization to remotely access and control the vehicle computing system/device. With these embodiments, the GUI configured for display on the primary vehicle touchscreen can be replicated on a passenger device to allow the passenger to access and interface with the same touch controls displayed on the primary touchscreen.

In various implementations, the visual appearance of the GUI (e.g., the layout/arrangement of graphical elements, the order of different GUI pages, etc.) rendered at the auxiliary device can mirror or otherwise correspond to that displayed on the primary touchscreen. With these implementations, a user that is familiar with the GUI and operating system employed by the primary vehicle touchscreen can easily navigate the corresponding GUI rendered at an external or auxiliary device (and vice versa). In other implementations, the visual appearance of the GUI rendered at the auxiliary device can vary from that displayed on the primary touchscreen. For example, the GUI rendered on the auxiliary device can be tailored to the dimensions and operating capabilities of the auxiliary device, tailored to preferences of the user of the auxiliary device, tailored to usage privileges granted to the user of the auxiliary device, and the like. In some embodiments, the vehicle features and functionalities accessed and controlled via the primary vehicle touchscreen can also be extended to one or remote devices located outside the vehicle (e.g., connected to the vehicle via a wireless communication network, such as the Internet or another suitable network). For example, if the car is parked, pre-approved users located outside the vehicle can access the car via an application on the personal mobile device of the pre-approved user to change vehicle settings, parking heater timer, and so on.

In some embodiments, the auxiliary device can be granted access to and enabled to remotely control most if not all vehicle functions and applications accessed and controlled via the primary touchscreen. In other embodiments, the specific functions and applications that can be accessed and controlled by an auxiliary device can be regulated and restricted as appropriate. For example, the driver of the vehicle may be distracted by another passenger in the vehicle that constantly changes vehicle temperature, radio station, music volume, and the like using a personal device enabled to remotely access and control these vehicle functions. In this regard, the disclosed techniques can provide a remote control authorization and regulation functionality (e.g., accessed and controlled via the primary vehicle touchscreen) that can allow one or more authorized entities (e.g., the driver, a system administrator, a machine executed regulatory software component, etc.) to control and regulate the specific vehicle functions/applications that can be remotely accessed and controlled by one or more auxiliary devices. For example, in some implementations, the specific vehicle functions/applications that can be remotely accessed and controlled by an auxiliary device can be based on the user of the auxiliary device (e.g., usage privileges granted to a child can be more restricted relative to usage privileges granted to an adult). In other implementations, the specific vehicle functions/applications that can be remotely accessed and controlled by an auxiliary device can be based on a context of the vehicle (e.g., a driving mode or mobility state of the vehicle, a vehicle speed, a vehicle location, a vehicle route, a time of day, current traffic levels, current weather, number and identity of other passengers in the vehicle, etc.). In another example, the specific vehicle functions/applications that can be remotely accessed and controlled by an auxiliary device can be based on a location of the auxiliary device (e.g., the front passenger seat, the back seat, inside the vehicle, outside the vehicle, within defined distance from the vehicle, etc.), the dimensions of the display screen of the auxiliary device, the operating capabilities of the auxiliary device, and the like.

In some embodiments, a selective presentation mode can be provided that allows a user to manipulate the primary vehicle touchscreen from an auxiliary device. In this regard, in addition to providing access to and enabling remote control of vehicle applications and functions, the disclosed techniques can provide for adapting and/or changing the content that is displayed on the primary vehicle touchscreen using an auxiliary device. For example, using an auxiliary device connected to the vehicle computing system/device, a user (other than the driver, for example) can interface with a vehicle navigation application and set up a desired navigation route. The navigation route can further be executed by the vehicle navigation application and displayed on the primary touchscreen based on permission granted to the auxiliary device to remotely control the vehicle navigation system.

One or more embodiments can also resolve conflicts that may arise in scenarios in which two or more auxiliary devices actively interface with the same vehicle function or application at or near the same time. For example, a scenario could arise in which two auxiliary devices simultaneously or concurrently attempt to remotely change the heating, ventilation, and air conditioning (HVAC) settings of the vehicle, the radio station being played, the speaker volume, etc. In this regard, in some embodiments, the disclosed systems can include a conflict resolution component that resolves conflicting instructions received from two or more auxiliary devices.

Various embodiments are described with reference to a touchscreen of an automobile (or car). However, the disclosed techniques are not limited to automobiles and can be adapted to facilitate interacting with touchscreens used in various types of vehicles and modes of transportation (e.g., a truck, a bus, a train, an airplane, a boat, etc.). The disclosed techniques can also be applied to facilitate interfacing with touchscreens in other domains (e.g., other than vehicles) that generally employ touchscreen controls to interface with and control a system or device.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates remotely controlling vehicle functions and applications accessed by touch controls displayed on a vehicle touchscreen using mirrored touch controls rendered at an auxiliary device. In accordance with various exemplary embodiments, system 100 can be deployed on or within a vehicle, such as an automobile 126, to facilitate remotely accessing and controlling one or more functions or applications of the automobile 126.

In this regard, system 100 can include an onboard vehicle system 101 that comprises a primary vehicle touchscreen 102, one or more other electronic systems/devices 104 of the vehicle, and a vehicle computing device 112. System 100 further includes one or more auxiliary device 124 that can be communicatively and operatively coupled to the vehicle computing device 112 of the onboard vehicle system 101 either via a wireless or wired connection.

The primary vehicle touchscreen 102 can display one or more interactive GUIs that facilitate accessing and/or controlling various functions and/or applications of the vehicle (e.g., automobile 126). In this regard, the GUIs can present one or more selectable graphical elements that can respectively correspond to a control for a function of the vehicle, an application, a function of the application, interactive data, a hyperlink to data, and the like, wherein selection and/or interaction with a graphical element as displayed on the primary vehicle touchscreen 102 via touch activates corresponding functionality. For example, one or more GUIs displayed on the primary vehicle touchscreen 102 can include selectable buttons or bars corresponding to a vehicle navigation application, a media application, a phone application, a back-up camera function, a car settings function, a parking assist function, and the like. In some implementations, selection of a button or bar corresponding to an application or function can result in generation of a new window or GUI comprising additional selectable icons or widgets associated with the selected application. For example, selection of the media application can result in generation of a new GUI or window that includes additional buttons or widgets for different media sources (e.g., radio, a streaming music system, music from an auxiliary input device or phone, etc.), different radio stations, volume controls, and the like. The type and appearance of the selectable graphical elements can vary. For example, the selectable graphical elements can include icons, symbols, widgets, windows, tabs, text, images, and the like In this regard, the primary vehicle touchscreen 102 can comprise a display screen that serves as both an output display device and an input device for the vehicle computing device 112. The primary vehicle touchscreen 102 can comprise suitable hardware that registers input events in response to touch (e.g., by a finger, stylus, gloved hand, pen, etc.). The type of the primary vehicle touchscreen 102 can vary and can include, but is not limited to, a resistive touchscreen, a surface capacitive touchscreen, a projected capacitive touchscreen, a surface acoustic wave touchscreen, and an infrared touchscreen. In various embodiments, the primary vehicle touchscreen 102 can be positioned on the dashboard of the vehicle, such as on or within the center stack or center console of the dashboard. However, the position of the primary vehicle touchscreen 102 within the automobile 126 can vary.

Other electronic systems/devices 104 can include one or more additional devices and systems (e.g., in addition to the primary vehicle touchscreen 102 and the vehicle computing device 112) of the automobile 126 that can be controlled based at least in part on commands issued by the vehicle computing device 112 (e.g., via the processing unit 122) and/or commands issued by the one or more auxiliary devices 124 communicatively coupled thereto. For example, the other electronic systems/devices 104 can include a media system (e.g., audio and/or video), a back-up camera system, an HVAC system, a lighting system, a cruise control system, a power locking system, a navigation system, a self-driving, a vehicle sensor system, and the like.

The vehicle computing device 112 can facilitate executing and controlling one or more operations of the vehicle, including one or more operations of the primary vehicle touchscreen 102, and the one or more other electronic systems/devices 104 using machine-executable instructions. In this regard, embodiments of system 100 and other systems described herein can include one or more machine-executable components embodied within one or more machines (e.g., embodied in one or more computer readable storage media associated with one or more machines, such as vehicle computing device 112). Such components, when executed by the one or more machines (e.g., processors, computers, computing devices, virtual machines, etc.) can cause the one or more machines to perform the operations described.

For example, the vehicle computing device 112 can include or be operatively coupled to at least one memory 120 and at least one processing unit 122. The processing unit 122 can be any of various available processors. Dual microprocessors and other multiprocessor architectures also can be employed as the processing unit 122. In various embodiments, the at least one memory 120 can store computer-executable instructions embodied as software functions/applications that when executed by the at least one processing unit 122, facilitate performance of operations defined by the executable instruction. In the embodiment shown, these computer-executable instructions or software components can include at least an operating system 106. The operating system 106 can act to control and allocate resources of the vehicle computing device 112. It is to be appreciated that the claimed subject matter can be implemented with various operating systems or combinations of operating systems.

These computer-executable instructions or software components can also include a remote-control unit 108, and one or more other vehicle applications 110. The remote-control unit 108 and/or the one or more other vehicle applications 110 can take advantage of the management of resources by operating system 106 through program modules and program data also stored in the memory 120. The remote-control unit 108 can provide various features and functionalities that facilitate remote control of various vehicle functions (e.g., provided by the other electronic systems/devices 104) and applications (e.g., of the one or more other vehicle applications 110) by one or more auxiliary devices 124. For example, the one or more other vehicle applications 110 can vary and include for example, a navigation application, a media player application, a phone application, a vehicle settings application, a parking assistance application, an emergency roadside assistance application, and the like. The features and functionalities of the remote-control unit 108 are discussed in greater detail infra.

The vehicle computing device 112 can further include one or more interface ports 114, a communication unit 116, and a system bus 118 that communicatively couples the various components of the vehicle computing device 112 (e.g., the one or more interface ports 114, the communication unit 116, the memory 120 and the processing unit 122). The one or more interface ports 114 can connect the primary vehicle touchscreen 102 (and other potential input devices) and the one or more other electronic systems/devices 104 to the vehicle computing device 112. For example, the one or more interface ports 114 can include, a serial port, a parallel port, a game port, a universal serial bus (USB) and the like.

The communication unit 116 can include suitable hardware and/or software that facilitates connecting one or more auxiliary device 124 to the vehicle computing device 112 either via a wireless connection and/or a wired connection. In various embodiments, the communication unit 116 can facilitate establishing a wireless connection with one or more auxiliary devices 124 using one or more networks. Such networks 1 can include wired and wireless networks, including but not limited to, a personal area network (PAN), a local area network (LAN), a cellular network, a wide area network (WAN, e.g., the Internet), and the like. For example, the one or more auxiliary devices 124 can communicate with the vehicle computing device 112 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), fifth generation partnership project (5G) communication system, third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, near field communication (NFC) technology, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this regard, the communication unit 116 can include software, hardware, or a combination of software and hardware that is configured to facilitate wired and/or wireless communication between the vehicle computing device 112 and the one or more auxiliary devices 124. While the communication unit 116 is shown for illustrative clarity as a separate unit that is not stored within memory 120, it is to be appreciated that one or more (software) components of the communication unit can be stored in memory 120 and include computer executable components.

The one or more auxiliary devices 124 can include any suitable computing device comprising a display and input device (e.g., a touchscreen) that can communicate with the vehicle computing device 112 and interface with the remote-control unit 108 (e.g., using a suitable application program interface (API). For example, the one or more auxiliary devices 124 can include, but are not limited to: a mobile phone, a smartphone, a tablet personal computer (PC), a digital assistant (PDA), a HUD, virtual reality (VR) headset, an augmented reality (AR) headset, or another type of wearable computing device, a desktop computer, a laptop computer, a television, an Internet enabled television and the like. As used in this disclosure, the terms "user," "driver," "passenger," and the like refer to a person, machine, entity, system, or combination thereof that can employ system 100 (or additional systems described herein) using the primary vehicle touchscreen 102 and/or one or more auxiliary devices 124.

Figure 2:
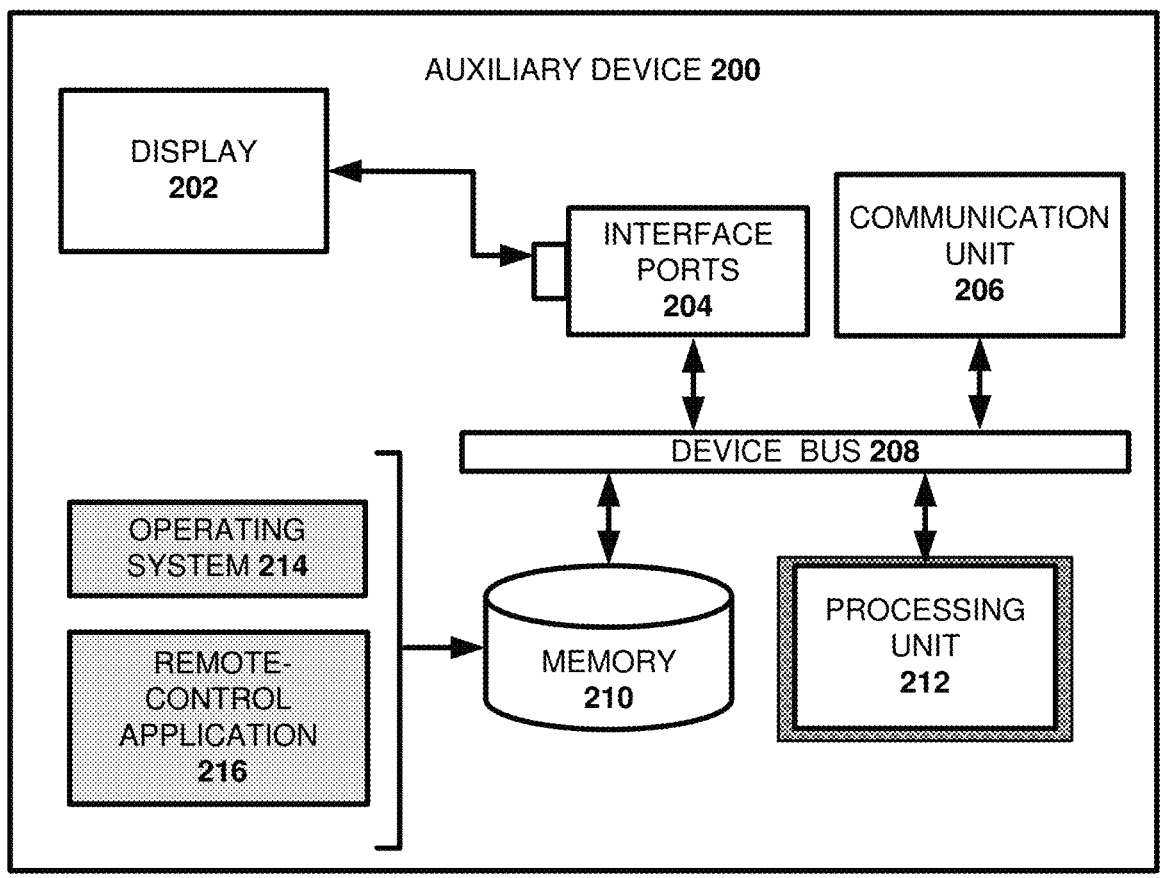
FIG. 2 illustrates a block diagram of an example, non-limiting auxiliary device that facilitates remotely controlling vehicle functions and applications accessed by touch controls displayed on a vehicle touchscreen in accordance with one or more embodiments described herein

FIG. 2 illustrates a block diagram of an example, non-limiting auxiliary device 200 (e.g., of the one or more auxiliary devices 124) that facilitates remotely controlling vehicle functions and applications accessed by touch controls displayed on a vehicle touchscreen in accordance with one or more embodiments described herein. In one or more embodiments, auxiliary device 200 can be or correspond to an auxiliary device of the one or more auxiliary devices 124 shown in system 100. In this regard, the one or more auxiliary device 124 can be or include one or more components of auxiliary device 200. Repetitive description of like elements employed in respective embodiments is omitted for sake of brevity.

In the embodiment shown, the auxiliary device 200 can include a display 202, one or more interface ports 204, a communication unit 206, at least one memory 210 and a processing unit 212. The at least one memory 210 can include computer executable components, including an operating system 214 and a remote-control application 216, that when executed by the processing unit 212, facilitate performance of operations defined by the computer executable components. The operating system 214 can vary depending on the type of auxiliary device 200, however the operating system can provide same or similar features and functionalities as operating system 106. In some embodiments, the display 202 can comprise a touchscreen. In accordance with these embodiments, the display 202 can provide same or similar features and functionalities as the primary vehicle touchscreen 102. In other embodiments, the display 202 can include standard display without a touchscreen that is coupled to one or more other input devices (e.g., a touchpad, a keyboard, one or more electromechanical buttons/knobs, etc.) to facilitate interfacing with a GUI rendered on the display). The one or more interface ports 204 can provide same or similar features and functionalities as the one or more interface ports 114, and the communication unit 206 can provide same or similar features and functionalities as communication unit 116. The auxiliary device 200 can further include a device bus 208 to communicatively couple the various components/devices of the auxiliary device 200 (e.g., the display 202, the one or more interface ports 204, the communication unit 206, the at least one memory 210 and the processing unit 212).

As noted with reference to FIG. 1, in one or more embodiments, the onboard vehicle system 101 can include a remote-control unit 108 to facilitate remote control of one or more vehicle functions and/or applications by an auxiliary device, such as auxiliary device 200. In accordance with various embodiments described herein, the auxiliary device 200 can include remote-control application 216 to facilitate remotely controlling the vehicle functions and applications in conjunction with the remote-control unit 108. For example, the remote-control application 216 can facilitate establishing a remote-control session between the auxiliary device 200 and the vehicle computing device 112, facilitate issuing and communicating control commands to control one or more vehicle functions/application issued from the auxiliary device, facilitate controlling display of a GUI at the auxiliary device 200 including interactive graphical elements (e.g., touch controls) to access and/or control one or more vehicle functions/applications, and the like.

In some implementations of these embodiments, with reference FIGS. 1 and 2, the vehicle computing device 112 and the one or more auxiliary devices 124 can operate in a server/client type relationship. Further, in some implementations, the vehicle computing device 112 and/or the one or more auxiliary devices 124 can employ a web-based platform (e.g., a website, a thin client application, a thick client application, etc.) to execute the features and functionalities of the remote-control unit 108 and/or the remote-control application 216. According to these embodiments, the remote-control application 216 can be or correspond to a thin client application, a thick client application, a hybrid application, or the like, that is configured to access and interface with the remote-control unit 108 either directly or via a web-based server.

Figure 3:
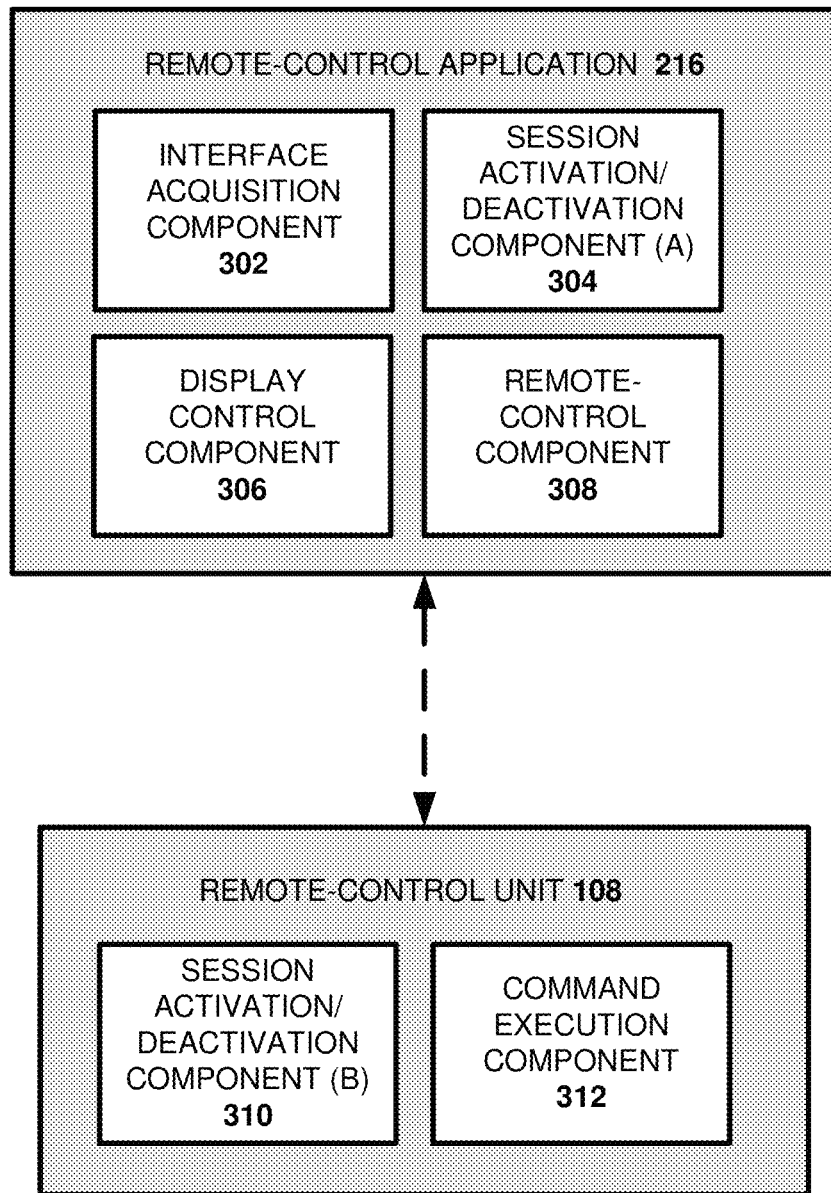
FIG. 3 illustrates a block diagram of an example, non-limiting remote-control application and remote-control unit that facilitate remotely controlling vehicle functions and applications accessed by touch controls displayed on a vehicle touchscreen using mirrored touch controls rendered at an auxiliary device in accordance with one or more embodiments described herein.

FIG. 3 illustrates a block diagram of an example, non-limiting, remote-control application 216 and remote-control unit 108 that facilitates remotely controlling vehicle functions and applications accessed by touch controls displayed on a vehicle touchscreen (e.g., primary vehicle touchscreen 102) using mirrored touch controls rendered at an auxiliary device (e.g., one or more auxiliary device 124) in accordance with one or more embodiments described herein.

With reference to FIG. 3 in view of FIGS. 1 and 2, the remote-control application 216 and the remote-control unit 108 can provide various features and functionalities that facilitate remote control of vehicle functions (e.g., provided by the other electronic systems/devices 104) and applications (e.g., the one or more other vehicle applications 110) by one or more auxiliary devices 124. The remote-control application 216 and the remote-control unit 108 can include computer executable components that can be stored in memory (e.g., memory 120, memory 210, or the like) that when executed by a processing unit (e.g., processing unit 122, processing unit 212, and the like) facilitate performance of the instructions defined by the computer executable components. For example, in one or more embodiments, the remote-control application 216 can include interface acquisition component 302, session activation/deactivation component (A), display control component 306, and remote-control component 308. The remote-control unit 108 can include session activation/deactivation component (B) 310, and command execution component 312

One or more components presented in the subject disclosure are denoted as being a version (A) or a version (B) of the component (e.g., session activation/deactivation component (A) 304 and session activation/deactivation component (B) 310. This notation is used to indicate that components noted as version (A) and version (B) provide same, similar and/or complementary functions. However, components denoted as version (A) are executed by an auxiliary device and/or the remote-control application of the auxiliary device (e.g., an auxiliary device 124), while components denoted as version (B) are executed by an on-board vehicle processing system (e.g., system 101), and/or the remote-control unit 108. Differences between features and functionalities of version (A) and version (B) of a component are identified when applicable.

The interface acquisition component 302 can provide for acquiring and/or determining interface information that defines a GUI configured for displaying on a primary vehicle touchscreen 102 that the remote-control application 216 is being used to remotely access and control. For example, the interface information can comprise programming information that defines the visual composition and temporal behavior of the GUI that is configured for rendering on the primary vehicle touchscreen 102. In this regard, the interface acquisition component 302 can determine and/or acquire information defining the touch controls included in a GUI configured for displaying on the primary vehicle touchscreen 102, then visual layout, appearance and origination of the touch controls, the specific vehicle functions/applications corresponding to the touch controls, the specific manner in which to interpret input control commands corresponding to user interaction with the touch controls, and the like. Accordingly, the interface acquisition component 302 can determine and/or acquire sufficient interface information regarding a GUI configured for display on a primary vehicle touchscreen 102 that enables the display control component 306 to render a representation (e.g., a mirrored version of the primary touchscreen GUI or a similar version of the primary touchscreen GUI) of the GUI at the auxiliary device that provides same or similar features and functionalities as the GUI as displayed on the primary vehicle touchscreen 102.

In some embodiments, the remote-control application 216 can be preconfigured with the interface information for a vehicle. For example, in one or more embodiments, the remote-control application 216 can include a software application that can be provided with the auxiliary device 124 by the manufacture (e.g., preinstalled on the auxiliary device 124) and/or downloaded from a remote, network accessible or cloud-based application system, often referred to as an "application store." For example, the application store can include an online portal, marketplace or digital distribution platform through which software programs are made available for procurement and download (e.g., via the Internet).

In some implementations, the remote-control application 216 can be tailored to a specific vehicle, such as a specific vehicle make, model, year, etc. With these implementations, the vehicle interface information can be built into or otherwise included with the remote-control application 216 based on the known features and functionalities of the touchscreen GUI installed with the specific vehicle make, model, year, etc. In this regard, many different versions of the remote-control application 216 can be developed and made available for download to or preinstalling on an auxiliary device 124, and an entity (e.g., a user or owner of a particular vehicle, the auxiliary device manufacturer, etc.) can select and download or otherwise install the version of the remote-control application that corresponds to the particular vehicle the entity would like to remotely control. In other implementations, the remote-control application 216 can include a universal application that can be tailored to remotely control a variety of different vehicles with different makes, models, years, etc. With these implementations, the remote-control application 216 can be preconfigured with the interface information for the vehicle and/or provided access to interface information (e.g., at a network accessible system/database) for all of the different vehicles. The interface acquisition component 302 can further allow a user to provide input selecting the specific type of vehicle they would like to remotely control (e.g., by make, model, year, and/or other suitable criteria). Based on the received input, (e.g., selecting a specific make, model, year, etc.), the interface acquisition component 302 can access and retrieve (e.g., in memory 120 and/or from the network accessible system/database) the corresponding interface information for that vehicle.

In the example embodiment described above, the interface acquisition component 302 can acquire interface information for a vehicle without connecting to the vehicle. (As used herein, reference to "connecting to" or "connection to" a vehicle as used herein indicates more specifically, connecting to the vehicle computing device 112 and more particularly to the remote-control unit 108 executed by the vehicle computing device 112). In various additional embodiments, the interface acquisition component 302 can acquire vehicle interface information based on and/or in response to connecting to the vehicle. With these embodiments, using the communication unit 206, an auxiliary device 124 can connect to the vehicle computing device 112, using a wireless or wired connection. For example, in some implementations, using the communication unit 206 the auxiliary device can establish a wireless connection to the vehicle computing device 112 using a suitable wireless communication protocol (e.g., BLUETOOTH®, Wi-Fi, etc.). In other implementations, the auxiliary device 124 can connect to the vehicle computing device 112 using a direct wired/cable connection (e.g., using a USB cable or the like). The interface acquisition component 302 can further be configured to acquire/receive interface information for the vehicle based on connection to the vehicle. For example, in some implementations, based on connection to the vehicle computing device 112, the interface acquisition component 302 can access (e.g., using one or more known APIs) the vehicle application or program (e.g., operating system 106) that controls rendering and interfacing with the GUI configured for display on the primary vehicle touchscreen 102, and retrieve the interface information. In another implementation, based on connection to the vehicle computing device 112, the interface acquisition component 302 can send a request (e.g., an API call) to the vehicle computing device 112 for the interface information. Based on the reception of the request, the vehicle computing device 112 can provide the auxiliary device 124 with the requested interface information.

The session activation/deactivation component (A) 304 and the session activation/deactivation component 310 (B) can respectively facilitate establishing a connection (e.g., a wireless or wired) between the auxiliary device 124 and the vehicle computing device 112 for purposes of employing the remote-control application 216 to remotely control one or more functions of the vehicle. The session activation/deactivation component (A) 304 and the session activation/deactivation component 310 (B) can also respectively facilitate disabling the connection (e.g., a wireless or wired) between the auxiliary device 124 and the vehicle computing device 112.

In some embodiments, the session activation/deactivation component (A) 304 and/or the session activation/deactivation component 310 (B) can activate a remote-control session between an auxiliary device 124 and the vehicle computing device 112 based on connection of the auxiliary device 124 to the vehicle computing device 112. For example, in some implementations, an auxiliary device 124 can connect to the vehicle computing device 112 using an existing mechanism provided by the communication unit 116 for connecting to the vehicle computing device 112 (e.g., using BLUETOOTH® technology, using Wi-Fi technology, etc.). Based on establishment of a connection between the auxiliary device 124 and the vehicle computing device 112, the session activation/deactivation component (A) 304 and/or the session activation/deactivation component 310 (B) can activate a remote-control session between the external device and the vehicle computing device 112. The session activation/deactivation component (A) 304 and/or the session activation/deactivation component 310 (B) can similarly deactivate the remote-control session based on disconnection of the auxiliary device from the vehicle computing device 112. In some implementations of these embodiments, the session activation/deactivation component 310 (B) can employ an existing security mechanism employed by the vehicle computing device 112 to ensure only authorized devices are allowed to connect with the vehicle computing device 112 and thus initiate a remote-control session with the computing device.

In other embodiments, the session activation/deactivation component 310 (B) can activate a remote-control session between an auxiliary device 124 and the vehicle computing device 112 based on reception of a request from the session activation/deactivation component (A) 304 to activate the remote-control session. For example, in association with establishing a connection between the vehicle computing device 112 and the auxiliary device 124, the session activation/deactivation component (A) 304 can send a request to the session activation/deactivation component 310 (B) requesting to establish a remote-control session with the vehicle computing device 112. With these embodiments, the session activation/deactivation component 310 (B) can activate the remote-control session based on reception of the request. The session activation/deactivation component 310 (B) can further deactivate the remote control session based on disconnection of the auxiliary device from the vehicle computing device 112 and/or based on occurrence of another defined event (e.g., shut down of the vehicle, closing of the remote-control application 216 at the auxiliary device, reception of a deactivation request from a control management component 606, as discussed with reference to FIG. 6, and the like). In some implementations, in association with reception of a remote-control session activation request, as discussed in greater detail with reference to FIG. 6) the remote-control unit 108 can perform a suitable security mechanism (e.g., including authentication and/or verification) to determine whether the auxiliary device (or a user of the auxiliary device) is authorized to remotely control the vehicle computing device 112. Based on a determination that the auxiliary device/user and/or a user of the auxiliary device 124 is authorized to remotely control the vehicle computing device 112, the session activation/deactivation component (B) 310 and/or the session activation component (A) 302 can activate a secure remote-control session between the vehicle computing device 112 and the auxiliary device 124

The display control component 306 can control rendering of the primary vehicle touchscreen GUI or a representation of the primary vehicle touchscreen GUI at a display (e.g., display 202) of an auxiliary device (e.g., of the one or more auxiliary devices 124). In this regard, the display control component 306 can control display of a representation of the GUI via the display (e.g., display 202) of the auxiliary device 124, wherein the representation comprises one or more graphical controls corresponding to one or more touch controls of the touch controls included in the primary vehicle touchscreen GUI. For example, in one or more embodiments, based on opening of the remote-control application 216 and/or activation of a remote-control session between the remote-control application 216 and the vehicle, the display control component 306 can display or cause the display of a representation of the GUI configured for displaying at the primary vehicle touchscreen 102 (e.g., the GUI used by the vehicle computing device 112, defined by the operating system 106, or the like) at the auxiliary device 124. In this regard, the GUI of the operating system 106 that is configured for display via the primary vehicle touchscreen 102 can include various selectable graphical elements that correspond to touch controls for vehicle functions (e.g., provided by the one or more other electronic systems/devices 104) and/or vehicle applications (e.g., of the one or more other vehicle applications 110). Based on activation of a remote-control session between the vehicle computing device 112 and an auxiliary device 124 executing the remote-control application 216, the display control component 306 can cause the primary vehicle touchscreen GUI or a representation thereof to be displayed at the auxiliary device such that the representation of the GUI displayed at the auxiliary device comprises at least some of these touch controls.

The appearance and functionality of the representation of the GUI displayed at the auxiliary device 124 can be based on the GUI configured for rendering at the primary vehicle touchscreen, as defined in the interface information. In some embodiments, the representation of the GUI can mirror or correspond to the GUI that is configured for displaying on the primary vehicle touchscreen. With these implementations, a user that is familiar with the GUI and operating system employed by the primary vehicle touchscreen can easily navigate the corresponding GUI rendered at auxiliary device (and vice versa). For example, in one or more implementations, the display control component 306 can determine what is currently being displayed on the primary vehicle touchscreen 102 and generate the representation of the GUI such that it mirrors what is currently being displayed on the primary vehicle touchscreen. In other implementations, the visual appearance of the GUI rendered at the auxiliary device can vary from that displayed on the primary touchscreen. For example, in some implementations, the display control component 306 can tailor the appearance of the representation of the primary vehicle touchscreen GUI displayed at an auxiliary device based on the features and functionalities of the auxiliary device 124. For example, the display control component 306 can tailor the size and arrangement of the graphical icons included in the representation of the GUI based on the dimensions of the display 202 (e.g., the look/design of the representation of the primary vehicle touchscreen 102 can be tailored to fit on a smaller display screen), the operating capabilities of the auxiliary device 124 and the like. In other embodiments, (discussed in greater detail infra) display control component 306 can control the specific graphical elements corresponding to the touch controls included in the primary vehicle touchscreen and the appearance of the graphical elements (e.g., size, number of graphical elements per GUI page, arrangement of the graphical elements, etc.) based on usage privileges associated with the auxiliary device and/or a user of the auxiliary device, preferences of the user of the auxiliary device, preference of an owner/operator of the vehicle, a context of the vehicle, a context of the auxiliary device, and the like.

In some embodiments, the display control component 306 can also generate and/or control rendering of a representation of the vehicle GUI at the auxiliary device when the auxiliary device 124 is disconnected from the vehicle computing device 112 and/or a remote-control session is otherwise not activated. With these embodiments, a user can view and interface with the GUI, however features and functionalities afforded by the GUI that enable remote control of one or more features and functions of the vehicle can be deactivated. For example, the display control component 306 can enable user interaction with a representation of the vehicle GUI in an "disconnected mode." In the disconnected mode, controls for one or more vehicle functions/applications represented by graphical elements in the GUI displayed at the auxiliary device can be deactivated such that a user cannot remotely control these vehicle functions/applications unless the auxiliary device is connected to the vehicle computing device 112. In some implementations, one or more of the graphical elements of the GUI corresponding to deactivated controls can be visually distinguished (e.g., grayed out, made partially transparent, etc.) or removed from the GUI. For example, the GUI can include a navigation application that provides for looking up destination locations, creating travel routes, and further executing a selected travel route by causing a navigation system of the vehicle to determine and track the vehicle location in real-time, provide live directions and mapping information, and the like. In some implementation, when in disconnected mode, some features of the navigation application can be activated while others deactivated and grayed out. For example, the activated features can include those that allow the user to look up destination locations and plan routes, while the control feature that enables a user to direct the vehicle navigation system to apply or execute a desired route can be deactivated and grayed out.

The remote-control component 308 can provide for remotely controlling one or more functions of the vehicle functions based on interaction with the one or more graphical controls of the representation of the primary vehicle GUI as displayed via the display 202 of the auxiliary device 124. For example, the remote-control component 308 can interface with the remote-control unit 108 and direct (e.g., via issued control commands) the remote-control unit 108 to execute the one or more functions in response to the interaction with the one or more graphical controls as displayed via the display. In particular, the remote-control component 308 can enable and control remote control, by an auxiliary device 124, of the vehicle functions/applications represented by the touch controls displayed at the auxiliary device based on establishment of an active remote-control session between the vehicle computing device 112 and the auxiliary device. In this regard, the remote-control component 308 can activate the interactive graphical elements of a vehicle GUI or representation of a vehicle GUI displayed at an auxiliary device that corresponds to touch controls that access and/or control one or more features and functionalities of the vehicle. The remote-control component 308 can further control execution of the one or more vehicle features and functionalities in response to user interaction with the activated GUI rendered at the auxiliary device.

For example, in some implementations, based on input received via user interaction with the GUI displayed at the auxiliary device, the remote-control component 308 can issue and/or send control commands to the vehicle computing device 112 to control a vehicle function or application. Likewise, the command execution component 312 of the remote-control unite can receive and apply the control commands to execute the corresponding vehicle functions and/or applications as run by the vehicle computing device 112. In this regard, by interfacing with the vehicle touch controls as displayed at the auxiliary device 124, a user can select and interact with the touch controls as if the user were selecting and interacting with the touch controls as displayed on the primary vehicle touchscreen. The command execution component 312 can further receive input commands (e.g., wireless command) generated by the remote-control component 308 based on user interaction with touch controls displayed at the auxiliary device and execute the actions represented by the input control commands at the vehicle computing device 112. Accordingly, the remote-control application 216 can serve as a proxy for the vehicle computing device 112 that facilitates the display of the primary vehicle touchscreen GUI or a representation thereof at an auxiliary device 124 and enables the auxiliary device to execute one or more functions of the GUI to remotely control the corresponding features of the vehicle. As a result, other passengers in the vehicle and/or users located outside of the vehicle can access and remotely control the various features and functionalities of the vehicle conventionally only accessed employing the primary vehicle touchscreen 102 by direct touch of the primary vehicle touchscreen.

Figure 4:
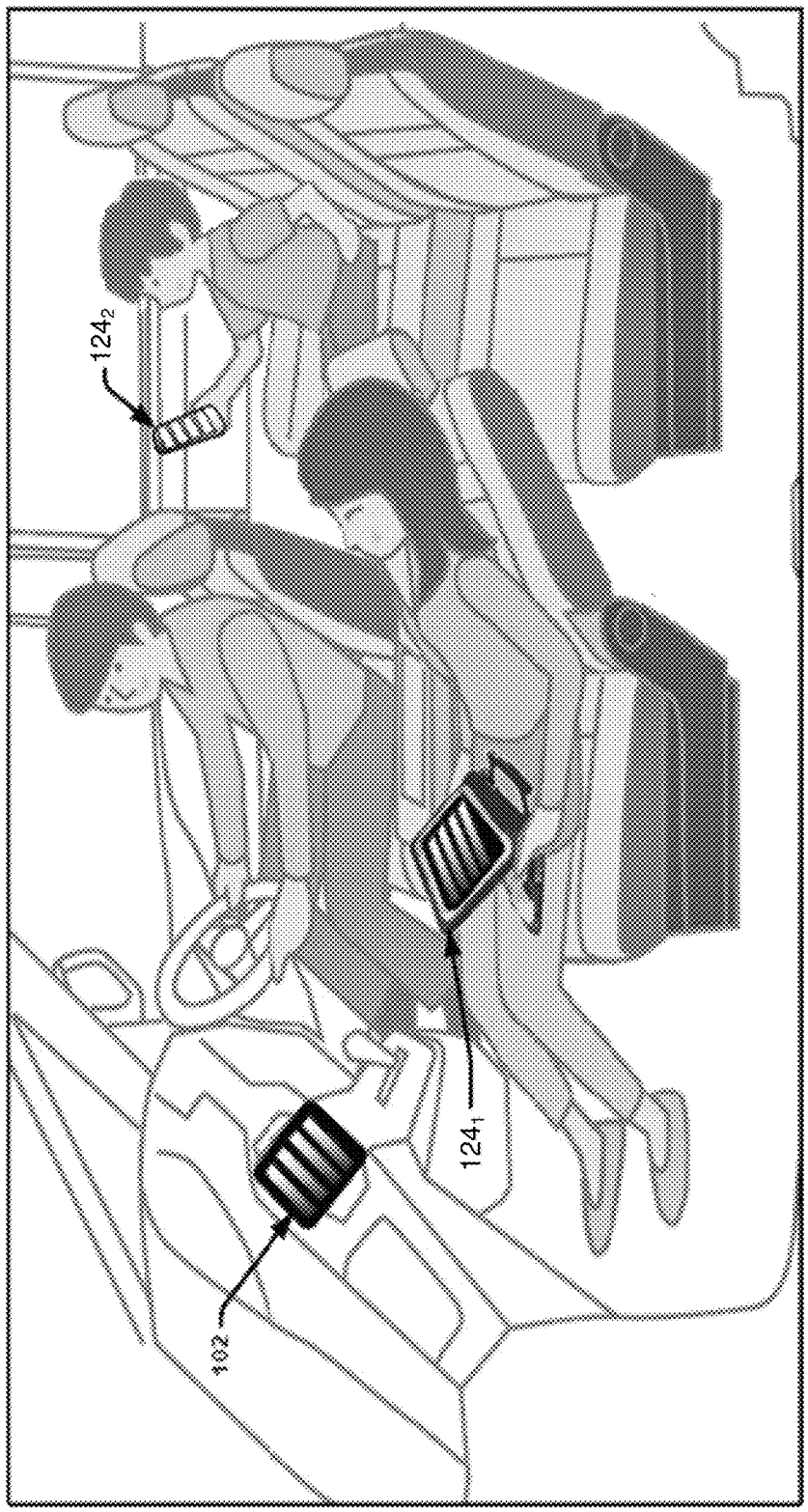
FIG. 4 presents an illustration of an example use case to remotely control vehicle functions and applications accessed by touch controls displayed on a vehicle touchscreen using mirrored touch controls rendered at an auxiliary device in accordance with one or more embodiments described herein.

For example, FIG. 4 presents an illustration of an example use case to remotely control vehicle functions and applications accessed by touch controls displayed on a vehicle touchscreen employing mirrored touch controls rendered at an auxiliary device in accordance with one or more embodiments described herein. FIG. 4 depicts a view of the interior of car with three people, including a driver seated in the driver's seat, a first passenger seated in the front passenger seat, and a second passenger seated in a back seat of the vehicle behind the driver. The vehicle comprises a primary vehicle touchscreen 102 located in the center stack dashboard. Each of the two passengers have handheld devices that are physically separated from the primary vehicle touchscreen, respectively referred to herein as auxiliary device 124$_1$ and auxiliary device 124$_2$. For instance, the first passenger has a tablet computer resting on her lap, and the second passenger has a smaller handheld device, such as a smartphone. In accordance with this example implementation, the primary vehicle touchscreen 102 can display a GUI with touch controls to control various functions and/or applications of the vehicle, and the handheld devices operated by each of the passengers can also display a representation of the GUI with one or more of the same touch controls. Employing their personal handheld devices (e.g., auxiliary device 124$_1$ and auxiliary device 124$_2$), the passengers can further interface with the vehicle functions and/or applications by employing the corresponding touch controls displayed via their devices. As a result, the first passenger can access/control the vehicle functions and/or applications without leaning forward to access the primary vehicle touchscreen. Likewise, the passenger in the rear seat can access/control the vehicle functions/applications.

Figure 5:
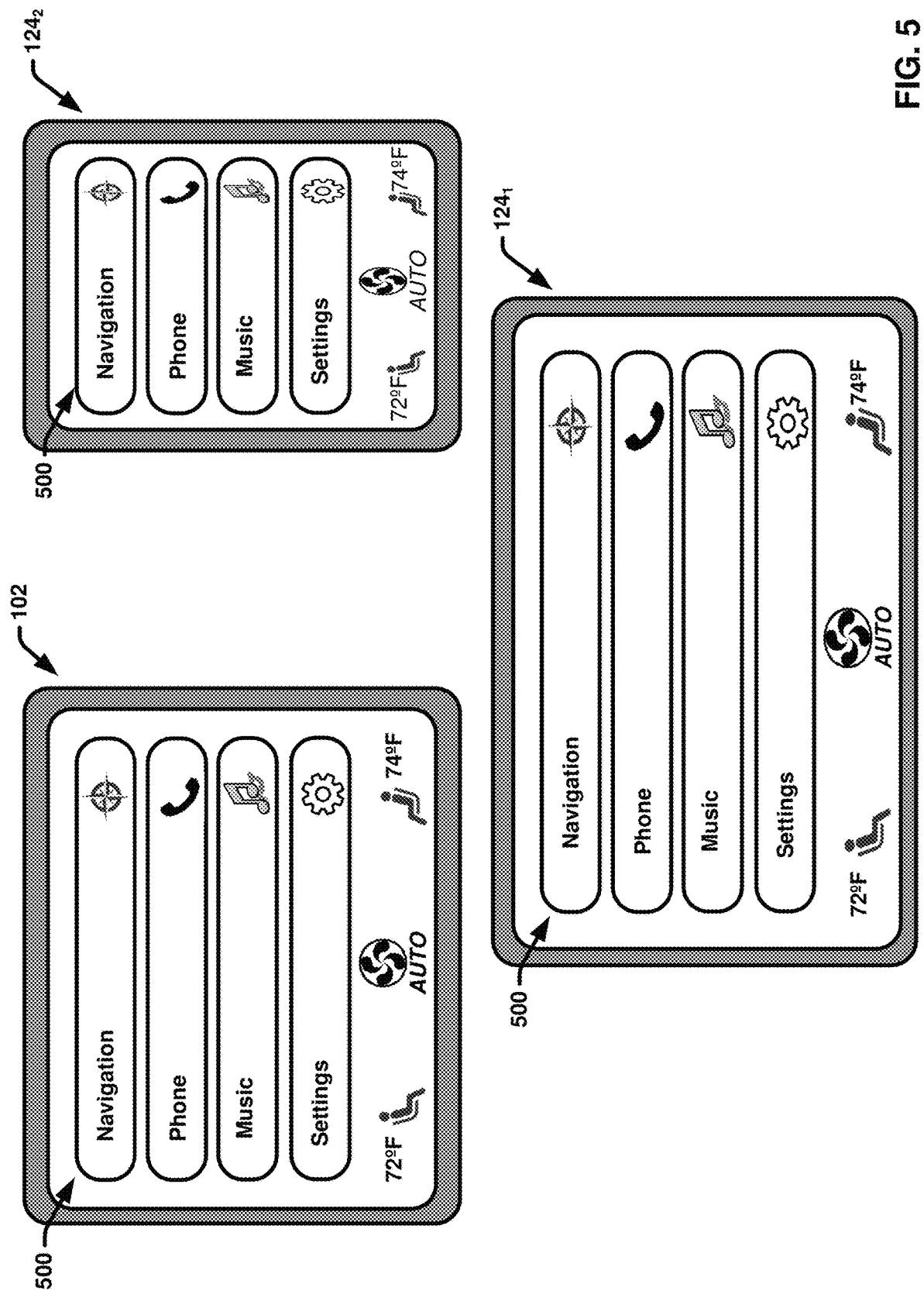
FIG. 5 presents an enlarged view of an example GUI displayed on a vehicle touchscreen and mirrored on auxiliary devices in accordance with one or more embodiments described herein.

FIG. 5 presents an enlarged view of example GUIs that can be displayed on the primary vehicle touchscreen 102 and mirrored on auxiliary device 124$_1$ and auxiliary device 124$_2$ in accordance with one or more embodiments described herein. As shown in FIG. 5, each of the auxiliary devices (e.g., auxiliary device 124$_1$ and auxiliary device 124$_2$) can display the same GUI (e.g., GUI 500) displayed on the primary vehicle touchscreen 102. In various implementations, employing GUI 500 as rendered on any of the devices, (e.g., the primary vehicle touchscreen 102, auxiliary device 124$_1$ and auxiliary device 124$_2$), a user can touch or otherwise interface with the various selectable graphical elements to access and/or control the corresponding vehicle functions and/or applications. For instance, example GUI 500 comprises various selectable graphical elements represented by selectable buttons or bars. The selectable buttons comprise text and icons to indicate the function or application they represent, which include for example, a navigation application, a phone application, a music application and a car settings function. The specific applications and/or functions represented in GUI 500 are merely exemplary and can vary. In accordance with this example implementation, the applications and/or functions can be selected/activated by touching or tapping anywhere within the defined area of the corresponding bar. GUI 500 also includes interactive controls for the HVAC system of the vehicle.

In the example implementation shown in FIG. 5, the visual appearance (e.g., the layout/arrangement of graphical elements, the order of different GUI pages, etc.) of the primary vehicle touchscreen GUI (identified as GUI 500) rendered at an auxiliary device can mirror or otherwise correspond to that displayed on the primary vehicle touchscreen 102. With these implementations, a user that is familiar with the GUI 500 and operating system employed by the primary vehicle touchscreen can easily navigate the corresponding GUI rendered at an external or auxiliary device (and vice versa). In other embodiments, the visual appearance of the vehicle GUI rendered at the auxiliary device can vary from that displayed on the primary touchscreen.

For example, with reference again to FIG. 3 in view of FIGS. 1 and 2, in various embodiment, the display control component 306 can control the specific graphical elements (and their corresponding applications or functions) that are displayed on respective GUI pages displayed at an auxiliary device 124, the arrangement of the graphical elements, the number of graphical elements, the size and shape of the graphical elements, the spacing of the graphical elements and the like, based on various factors. For example, the display control component 306 can control the visual appearance of a vehicle GUI presented at an auxiliary device based on the dimensions of the display screen of the auxiliary device, an operating system of the auxiliary device, and/or the capabilities of the auxiliary device. In another example, the display control component 306 can control the appearance of the GUI rendered at an auxiliary device based on preferences of the user of the auxiliary device, usage privileges granted to the user of the auxiliary device, and the like.

In some embodiments, in addition to controlling the vehicle GUI or representation of the vehicle GUI as displayed on an auxiliary device, the display control component 306 can also control the content displayed on the primary vehicle touchscreen 102 in association with one or more active remote-control sessions between the vehicle computing device 112 and one or more auxiliary devices 124. In this regard, in some implementations, the display control component 306 can enable interaction with a vehicle GUI or representation thereof as displayed at an auxiliary device in one or more different modes of operation. For example, the one or more different modes of operation can include the "disconnected mode" as discussed above, a "screen mirroring mode," an "autonomous mode," and a "selective presentation mode." In some implementations, the display control component 306 can facilitate activation of a specific mode based in part on user input. For example, the display control component 306 can allow a user to provide input selecting a specific mode of operation. In other embodiments, as discussed in greater detail infra, the display control component 306 can control the mode of operation based on defined management criteria (e.g., privileges granted to specific auxiliary devices/users, vehicle context, context of the auxiliary device, location of the auxiliary device, number of connected auxiliary devices, etc.).

With the "screen mirroring mode," the remote-control unit 108 and the display control component 306 can facilitate simultaneous or concurrent rendering of the GUI displayed on the primary vehicle touchscreen at the auxiliary device. For example, in some embodiment, based on reception of a "screen-mirroring request" from the display control component 306, the remote-control unit 108 can extract the full GUI content displayed on the primary vehicle touchscreen 102 and send, stream, cast, etc., the GUI content to the auxiliary device 124. The display control component 306 at the auxiliary device can further receive the GUI content and generate and/or cause the presentation of a real-time replica of the GUI content displayed on the primary vehicle touchscreen 102 at the display 202 of the auxiliary device. In accordance with the screen mirroring mode, the GUI displayed on the primary vehicle touchscreen 102 can adapt to mirror changes to the GUI at the auxiliary device, and vice versa. For example, if a user of the auxiliary device changes a page of the GUI displayed on the auxiliary device from a home page to a second page, the display control component 306 can also adapt the GUI as displayed on the primary vehicle touchscreen, and vice versa. In accordance with the screen mirroring mode, the remote-control component 308 can provide full control, partial control and/or shared control over the vehicle functions/applications rendered on the GUI at the auxiliary device 124.

In accordance with the "autonomous mode," the display control component 306 can independently control the content displayed on the display 202 of the auxiliary device relative to the GUI displayed (or not displayed/turned off) at the primary vehicle touchscreen 102 in association with an active remote-control session between the auxiliary device 124 and the vehicle computing device 112. In accordance with the autonomous mode, the content displayed on a representation of the vehicle GUI displayed at the display 202 of an auxiliary device 124 in response to user interaction therewith can be independent of the content displayed on the primary vehicle touchscreen 102. For example, in association with interacting with a vehicle GUI or representation thereof as displayed at an auxiliary device 124, if a user of an auxiliary device changes the GUI page displayed, selects an application, interacts with a vehicle control function, etc., the display control component 306 can adapt the GUI displayed at the auxiliary device accordingly based on the user interaction therewith. However, the primary vehicle touchscreen can remain unchanged. For instance, remote-control unit 108 can cause the primary vehicle touchscreen to remain fixed on the home page, be dimmed, or even turned off. However, the command execution component 312 can continue to execute vehicle commands issued by the remote-control component based on user interaction with the GUI displayed at the auxiliary device 124 even though the primary vehicle touchscreen remains fixed on the home page, dimmed, turned off, etc.

The "selective presentation mode" can provide for selectively controlling, by an auxiliary device 124, the content displayed on the primary vehicle touchscreen 102. In this regard, in some implementation, the selective presentation mode can operate similar to the autonomous mode, wherein changes to a vehicle GUI as displayed on a display 202 of an auxiliary device in response to user interaction with the vehicle GUI at the auxiliary device are not mirrored at the primary vehicle touchscreen 102. However, in some implementations, the selective presentation mode enables the auxiliary device 124 to remotely control the content displayed at the primary vehicle touchscreen 102 based on user input. In particular, when employing the selective presentation mode in association with an active remote-control session, a user of an auxiliary device 124 can send a request (e.g., via the remote-control component 308) to the vehicle computing device 112 that directs the vehicle computing device 112 to display a particular GUI page, open a particular application and render the corresponding GUI for that application, run a particular application and render the corresponding GUI for that application, and the like. For example, in association with the selective presentation mode, the remote-control component 308 can allow an auxiliary device that is connected to the vehicle computing device 112 to access a vehicle navigation application of the vehicle computing device 112. Employing the remote-control application 216, a user can further set up a navigation route for the vehicle. After the user has set up a desired navigation route, the user can further direct (e.g., via the remote-control component 308) the navigation application to execute the navigation route and direct the primary vehicle touchscreen to display the live map corresponding to the route. The command execution component 312 can further cause the primary vehicle touchscreen 102 to display the navigation application and the corresponding route at the direction of the auxiliary device without the driver having to take any action except granting access.

In another implementation, the selective presentation mode can allow an auxiliary device to selectively control mirroring of an auxiliary device GUI at the primary vehicle touchscreen 102. For example, in association with usage of the selective presentation mode, the remote-control component 308 can send a request (e.g., in response to user input), that directs the primary vehicle touchscreen 102 to mirror the GUI display at the auxiliary device. Based on reception of the request, the command execution component 312 can execute the screen mirroring command.

Figure 6:
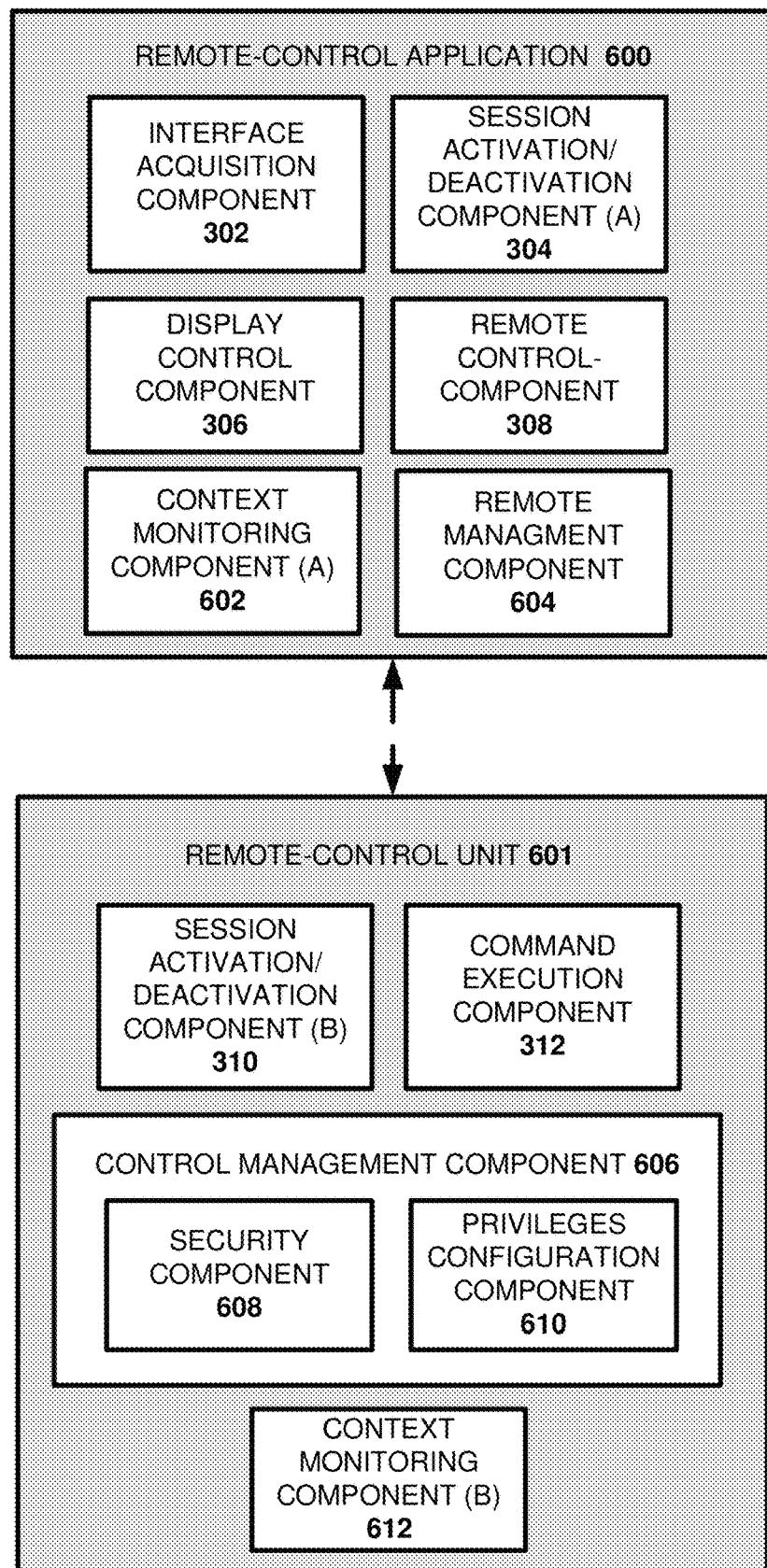
FIG. 6 illustrates a block diagram of an example, non-limiting remote-control application and remote-control unit that facilitate managing access to and control of vehicle functions and applications by an auxiliary device in accordance with one or more embodiments described herein.

FIG. 6 illustrates a block diagram of an example, non-limiting, remote-control application 600 and remote-control unit 601 that facilitates managing access to and control of vehicle functions and applications by an auxiliary device (e.g., of one or more auxiliary device 124) in accordance with one or more embodiments described herein. Remote-control application 600 includes same or similar components as remote-control application 216 with the addition of context monitoring component (A) and remote management component 604. Remote-control unit 601 includes same or similar components as remote-control unit 108 with the addition of control management component 606 and context monitoring component (B) 612. Repetitive description of like elements employed in respective embodiments is omitted for sake of brevity.

The control management component 606 can provide for managing and regulating remote control of one or more features, functionalities, and/or applications of a vehicle by an auxiliary device 124 and/or user of the remote-control application 600. For example, in some embodiments, the control management component 606 can facilitate regulating and controlling what auxiliary devices and/or users of the remote-control application 600 can connect to the vehicle and/or be allowed to remotely access and/or control the one or more one or more features, functionalities, and/or applications of the vehicle. The control management component 606 can also facilitate controlling specific subsets of the vehicle features, functionalities, and/or applications that can be accessed and controlled by an auxiliary device 124 and/or user of the auxiliary device based on rights/privileges granted thereto, a context of the vehicle, a context of the auxiliary device, and the like.

In accordance with these embodiments, the control management component 606 can include security component 608 to facilitate ensuring only authorized auxiliary devices and/or users of the auxiliary devices can connect to the vehicle and/or access and/or remotely control one or more electronic features, functionalities and/or applications of the vehicle. For example, the security component 608 can facilitate identifying one or more auxiliary devices 124 and/or users of auxiliary devices that initiate connecting to the vehicle and/or that initiate usage of the remote-control application 600 to remotely control and/or access one or more features, functionalities and/or applications of the vehicle. The security component 608 can further determine whether the identified auxiliary devices and/or users are authorized to connect to the vehicle and/or use the remote-control application to remotely control/access the vehicle. The security component 608 can further facilitate preventing and/or enabling connection of the auxiliary device to the vehicle and/or activation of the remote-control features and functionalities of the remote-control application 600 based on whether an auxiliary device and/or user is authorized. The security component 608 can also employ a mechanism to verify the identities of the auxiliary devices/and/or users.

For example, in various implementations, the remote-control unit 601 and/or the remote-control application 600 can access preconfigured information identifying one or more auxiliary devices 124 and/or users of the auxiliary devices that are authorized to connect to the vehicle for the purpose of performing remote control of the vehicle. In various implementations, this preconfigured information is referred to herein as "remote-control management information." The remote-control management information can for example be defined in memory 120, defined in memory 210, provided by the control management component 606, provided in a remote database or system, or the like. In some implementations, discussed below, this remote-control management information can be defined and applied by the privileges configuration component 610. In this regard, the remote-control management information can identify authorized auxiliary devices and/or users by a unique identifier (e.g., serial number, phone number, name, username, etc.) which can be provided to the security component 608 or otherwise determined by the security component 608. With these embodiments, the security component 608 can prevent unauthorized devices and/or users from connecting to the vehicle, and/or prevent unauthorized devices and/or users from employing the features and functionalities of the remote-control application 600 to remotely control and/or access features/functionalities/applications of a vehicle.

For example, in one implementation, if the security component 608 determines that a particular auxiliary device 124 and/or user of the auxiliary device is not authorized to use the remote-control application 600 to remotely control/access features of a particular vehicle, the security component 608 can direct the communication unit 116 and/or the session activation/deactivation component (B) 310 to disable, deactivate or otherwise prevent connection establishment between the auxiliary device 124 and the vehicle computing device 112. In another implementation, if the security component 608 determines that a particular auxiliary device and/or user of the auxiliary device is not authorized to use the remote-control application 600 to remotely control/access features of a particular vehicle, the security component 608 can prevent the remote-control application from opening at the auxiliary device 124 or otherwise direct the session activation/deactivation component (A) to disable or deactivate features and functionalities of the remote-control application 600 that provide for accessing and controlling features/functions/applications of the vehicle.

The security component 608 can employ various suitable authentication techniques to verify identities of authorized auxiliary devices and/or users of the auxiliary devices. For example, in some embodiments, the remote-control application 600 can require users to register or establish personal user accounts wherein the users are identified by a unique user account name/identity. With these implementations, the security component 608 can identify a particular user of the remote-control application 600 based on their user account name/identity. The security component 608 can further employ a suitable mechanism to authenticate users prior to allowing them access to remote control functionality for a particular vehicle afforded by the remote-control application 600. For example, the security component 608 can require users to log in to their accounts using a secret password, passcode, etc. to verify their identities. According to this example, based on successful login and a determination that the user account is authorized to remotely control/access the vehicle features/functions/applications, the security component 608 can direct the remote-control component 308 to enable the remote control/access functionality afforded by the remote-control application 600. In some embodiment, one or more of the features and functionalities of the security component 608 can be applied by and/or performed by the remote-control application 600. For example, the remote-control application 600 can control activation of one or more features and functionalities thereof to enable a user of the remote-control application 600 to remotely control one or more features and functionalities of the vehicle based on successful login of the user to the remote-control application and further based on usage privileges and rights granted to that user.

In various alternative embodiments, the session activation/deactivation component (A) 304 and/or the session activation/deactivation component (B) can facilitate ensuring only authorized auxiliary devices and/or users of the auxiliary devices can connect to the vehicle. With these embodiments, one or more features and functionalities of the security component 608 can be executed by the session activation/deactivation component (A) 304, the session activation/deactivation component 310 (B), the communication unit 116, and/or the communication unit 206. For example, the communication unit 116 can employ a suitable security mechanism to ensure only authorized devices are allowed to connect with the vehicle computing device 112 and thus initiate a remote-control session with the vehicle computing device. For instance, the communication unit 116 and/or the session activation/deactivation component (B) can employ an existing wireless communication protocol (e.g., BLUETOOTH® technology, Wi-Fi technology, etc.) that maintains a list of devices that are paired with the vehicle computing device 112 or otherwise authorized to connect to the vehicle computing device 112. According to this example, the communication unit 116 and/or the session activation/deactivation component 310 can allow only paired/authorized devices to connect to the vehicle computing device 112.

In some embodiments, based on connection of an authorized auxiliary device and/or user of the auxiliary device to the vehicle and/or a determination that a connected auxiliary device and/or user of the connected auxiliary device is authorized to remotely access and/or control vehicle features, functionalities and/or applications using the remote-control application 600, the security component 608 can direct the remote-control component 308 to activate the vehicle GUI displayed at the auxiliary device 124 and enable remote control of the vehicle using the vehicle GUI.

In other embodiments, rather than allowing any connected and/or authorized auxiliary device and/or user to remotely access and/or control all available vehicle features, functions and/or applications, the remote control management information can further define or indicate specific "usage privileges" regarding what vehicle features, functions and/or applications a particular auxiliary device 124 and/or user can access and control can be regulated and restricted based on defined conditions. For example, usages privileges regarding specific vehicle features, functions and/or applications a particular auxiliary device 124 and/or user can be allowed to remotely access and/or control can vary from user to user based on preferences of an owner or operator of the vehicle. Usage conditions regarding when an auxiliary device/user can remotely control/access certain vehicle features, functions and/or applications can also vary based on a context of the vehicle, a location of the auxiliary device 124, and the like. With these embodiments, the control management component 606 can further facilitate regulating remote control of one or more vehicle functions based on remote control management information that further defines conditions surrounding the specific vehicle functions and/or applications that particular auxiliary devices and/or users are authorized to access and/or control, and conditions surrounding when (e.g., contextual conditions) the auxiliary devices and/or users can establish control those specific vehicle functions and/or applications. This type of remote-control management information can for example also be defined in memory 120, defined in memory 210, provided by the control management component 606, provided in a remote database or system, or the like. In some implementation, discussed below, this type of remote-control management information can also be defined and applied by the privileges configuration component 610.

For example, in addition to defining what auxiliary devices/users can remotely connect to, access, and/or control a vehicle, the remote-control management information can further provide rules and regulations regarding what specific vehicle functions/applications an external device/user can access and/or control. For example, a driver of a vehicle may allow child passengers to access a music application of the vehicle but deny them access to controls for operating the electric windows. The remote-control management information can further provide rules and regulations regarding contextual conditions and/or scenarios that control when to enable/disable remote control functionality and what specific vehicle functions/applications can be accessed/controlled by certain auxiliary devices/users under different contextual conditions and/or scenarios. For example, some different contextual conditions and/or scenarios can be based on but are not limited to: a driving mode or mobility state of the vehicle (e.g., on/off, in park, in drive, in neutral, in reverse, manual, automatic, etc.), a vehicle speed, a vehicle location, a vehicle route, a vehicle status (e.g., normal, emergency state, broken down, collision state, etc.) a time of day, current traffic levels, current weather, and the like. For instance, to minimize distraction to the driver in scenarios in which traffic conditions are high, weather conditions are hazardous, and the like, remote control functions for controlling vehicle music system by auxiliary devices can be disabled. In another example, in a situation in which the vehicle is in a parked state, an auxiliary device operated by an authorized user can be temporarily allowed to control the vehicle locking system (e.g., a rear door child lock mechanism) using a connected external device. Some additional contextual factors that can be used to control enablement/disablement of remote control of certain vehicle functions/applications can include for the example, number and identity of other passengers in the vehicle, identity of vehicle driver (e.g., different drivers can apply different remote control privilege preferences) number of remote control sessions established with the vehicle, and specific external devices/users with established remote control sessions.

In another example, the specific vehicle functions/applications that can be remotely accessed and controlled by an auxiliary device using the remote-control application 600 can be based on a location of the auxiliary device 124 relative to the vehicle. For example, the specific vehicle functions/applications that can be remotely accessed and controlled by an auxiliary device can be based on a particular location of the auxiliary device within the vehicle (e.g., the front passenger seat, the back seat, etc.). In other embodiments, one or more of the vehicle features and functionalities that can be accessed and controlled using the remote-control application 600 can be enabled when the auxiliary device is located outside the vehicle (e.g., connected to the vehicle via a wireless communication network, such as the Internet or another suitable network). For example, remote controls of certain functions and/or applications of the vehicle can be disabled by the remote-control component 308 based on movement of a connected auxiliary device outside of the vehicle while other functions/or applications can be enabled. In some implementations, the specific vehicle features, functions, and/or applications that can be remotely controlled/accessed using the remote-control application 600 can also be restricted based on a distance between the auxiliary device 124 away from the automobile 126. For example, the remote-control component 308 can enable/disable certain vehicle functions/controls based on the external device being over or under a defined distance from the vehicle (e.g., enable the external device with a remote-control locking/unlocking mechanism of the vehicle if within X feet of the vehicle, and the like). The specific vehicle functions/applications that can be remotely accessed and controlled by an auxiliary device 124 can also be based on dimensions of the display screen of the external device, the operating capabilities of the external device, and the like.

In various embodiments, the remote-control management information can be applied by the remote-control component 308 to control activating and deactivating remote control/access of one or more vehicle functions/applications via the vehicle GUI displayed at the auxiliary device 124. With these embodiments, based on connection of an auxiliary device 124 to the vehicle and/or opening of the remote-control application 600, the remote-control component 308 can receive and examine the remote-control management information (e.g., provided by the control management component 606 in association with activation of a remote control session, stored in memory 210, or received in another suitable fashion) and determine what specific vehicle features, functions and/or applications the auxiliary device and/or user of the auxiliary device is authorized to access and/or remotely control. In implementations in which the remote control management information further defines contextual conditions regarding when certain vehicle features/functions can be accessed and/or controlled by the auxiliary device/user, the remote-control component 308 can also determine and select the specific vehicle functions/applications the auxiliary device/user is authorized to access/control based on any contextual restrictions defined by the remote control management information. The remote-control component 308 can further activate the corresponding graphical control components as included in the vehicle GUI.

For example, in some embodiments, the control management component 606 can provide the remote-control component 308 with remote control management defining rules and regulations regarding what vehicle features and functions the auxiliary device or user of the auxiliary device can access and when in association establishment of an authorized remote-control session with the vehicle. For example, in implementations, the session activation/deactivation component (B) 310 can require the remote-control application 600 to send a request (e.g., via the session activation/deactivation component (A) 304) to perform a remote-control session with the vehicle or otherwise use the remote-control application 600 to remotely control/access one or more features and functionalities of the vehicle. With these embodiments, in association with an auxiliary device 124 connecting to the vehicle and/or opening of the remote-control application 600 at the auxiliary device 124, the session activation/deactivation component (A) 304 can send the remote-control unit 601 a request to initiate a remote-control session with the vehicle. Based on reception of the request, the session activation/deactivation component (B) 310 can determine (e.g., using the security component 608) whether the auxiliary device/user of the auxiliary device is authorized to remotely control the vehicle (e.g., based on the control management information). For example, the session activation/deactivation component 310 (B) can determine whether the auxiliary device/user is listed as an authorized device to remotely control the vehicle, to control the vehicle under the current context (e.g., based on an operating state of the vehicle, based on a number of other connected devices, and the other various contextual parameters discussed herein), and the like. If the auxiliary device/user is authorized, the session activation/deactivation component (B) 310 can respond to the request by sending the remote-control application 600 an activation message granting the request. Likewise, if the auxiliary device/user is unauthorized, the session activation/deactivation component (B) 310 can respond to the request by sending the remote-control application 600 a message denying the request. The session activation/deactivation component (A) 304 can further be configured to activate and/or deny activation of the remote-control capabilities of the remote-control application for the vehicle based on whether the received response grants or denies the request.

In some embodiments, in association with sending a response to a remote control session request granting the remote-control application 600 authorization to use the remote-control application 600 to remotely control/access a vehicle electronic features, functions and/or applications, the response can define specific parameters or conditions of the usage privileges granted to the auxiliary device/user of the auxiliary device defined by the remote control management information. For example, the response can include information defining the specific usage permissions granted to the auxiliary device/user, such as what specific vehicle functions/features the auxiliary device can and can't remotely control/access, contextual conditions surrounding when the auxiliary device can and can't use certain features of the vehicle using the remote-control application 600 and the like. In this regard, the response message can include the remote-control management information defined for that auxiliary device/user of the auxiliary-device. The remote-control component 308 can further be configured to apply the remote-control management information received in the response to control activating and/or deactivating one or more features and functionalities of the remote-control application 600. In some implementations of these embodiments, after a remote-control application 600 has received the remote-control management information for a specific auxiliary device/user and vehicle combination, the remote-control application 600 can store the information for use in subsequent sessions. In this regard, the control management component 606 can be configured to only provide additional remote-control management information in association with subsequent remote-control session when the information has changed or been updated since the last session.

In some embodiments, the remote-control management information can also be employed by the display control component 306 to facilitate configuring and/or adapting a vehicle GUI and/or a representation of the vehicle GUI as displayed at an auxiliary device. In this regard, in some embodiments, the display control component 306 can control what graphical elements are displayed via the GUI rendered at the display 202, when they are displayed, the appearance of the graphical elements, and the like, based on whether the auxiliary device and/or the user of the auxiliary device are authorized to access and/or control the corresponding vehicle functions based on the control management information (and in some implementations a current context). For example, in some implementations, the display control component 306 can select the graphical elements (e.g., corresponding to one or more touch controls of the primary vehicle touchscreen GUI) to include in a representation of a primary vehicle touchscreen GUI based on the usage privileges granted to the auxiliary device and/or a user of the auxiliary device, a context of the vehicle, a location of the auxiliary device and the like. The display control component 308 can also control the visual appearance, arrangement/layout of the representation of the GUI, number of graphical elements, order of the graphical elements, size of the graphical elements, etc. based on the usage privileges granted to the auxiliary device and/or a user of the auxiliary device, a context of the vehicle, a location of the auxiliary device and the like. In other implementations, the display control component 306 can visually distinguish graphical elements for vehicle applications/functions that are activated for remote control and those which are disabled (e.g., via greying icons for disabled functions/applications). In other implementations, the display control component 306 can exclude graphical elements for vehicle applications/functions that are not authorized for remote control by the auxiliary device. The display control component 306 and the remote-control component 308 can also consider one or more contextual conditions associated with the remote-control session to further determine and select the specific vehicle functions/applications the auxiliary device is authorized to access/control based on any contextual restrictions defined by the remote-control management information.

In accordance with one or more embodiments in which the enablement/disablement of remote control of certain vehicle functions/application can vary based on contextual factors/scenarios, the remote-control application 600 can include context monitoring component (A) 602, and/or the remote-control unit 601 can include context monitoring component (B) 612 to monitor and determine contextual parameters (e.g., those noted above and similar contextual parameters) in association with operation of the auxiliary device 124 and/or the vehicle to facilitate enabling/disabling remote control functionality for an auxiliary device accordingly. For example, the monitoring component (A) 602 and/or monitoring component (B) 612 can determine contextual information regarding but not limited to: a driving mode or mobility state of the vehicle (e.g., on/off, in park, in drive, in neutral, in reverse, manual, automatic, etc.), a vehicle speed, a vehicle location, a vehicle route, a vehicle status (e.g., normal, emergency state, broken down, collision state, etc.) a time of day, current traffic levels, current weather, number and identity of other passengers in the vehicle, identity of vehicle driver (e.g., different drivers can apply different remote control privilege preferences) number of auxiliary device connected to the vehicle, and specific auxiliary devices/users with established remote control sessions, location of the auxiliary device 124, and the like. In this regard, as the context parameters change over a course of an active remote control session between an auxiliary device and the vehicle computing device 112, the remote-control component 308 can dynamically determine what specific vehicle features, function and/or applications to provide, activate and/or deactivate remote control of for a particular auxiliary device and/or user of the auxiliary device, and respond accordingly (e.g., by directing the display control component 306 to include or remove the corresponding functions/application from the GUI rendered at the external device, and/or by activating or deactivate remote control of the corresponding functions/applications using the GUI). Thus, in some embodiments, the display control component 306 can dynamically adapt the appearance of the GUI and/or activation and deactivation of remote control functions at an auxiliary device based on changes in context.

In various additional embodiments, the control management component 606 can also control activation and deactivation of one or more features and functionalities of a remote-control application 600 being used auxiliary device in real-time. For example, in one implementation, after an auxiliary device has connected to the vehicle or otherwise established an active remote control session with the vehicle, the control management component 606 can send activation/deactivation commands to the remote-control application based on changes in context of the vehicle, based on changes in location of the slave auxiliary device, and the like (e.g., determined based on the context information generated by the context monitoring component (B) 612). In this regard, if the context of the vehicle and/or slave auxiliary device changes and the control management information warrants activation or deactivation of one or more remote control capabilities of the remote-control application 600 at the auxiliary device based on the changes to the context, the control management component 606 can send an activation or deactivation command to the auxiliary device directing the auxiliary device to activate or deactivate the appropriate remote control capabilities. The remote-control component 308 can further be configured to respond accordingly and activate or deactivate the appropriate remote-control capabilities as identified in the activation/deactivation command. In other embodiments, the control management component 606 can allow a user to directly interface with the primary vehicle touchscreen 102 to select and initiate sending of activation/deactivation commands to an auxiliary device at will. For example, the control management component 606 can receive user input via the primary vehicle touchscreen 102 identifying an auxiliary device and defining the specific features and functionalities of the remote-control application 600 of the auxiliary device to activate or deactivate (e.g., activate or deactivate all remote-control capabilities, activate or deactivate remote control of only the music system, etc.). The control management component 606 can further send the activation/deactivation command to the auxiliary device at the direction of the user (e.g., in response to user input by the user via the primary vehicle touchscreen 102 device requesting to send the deactivation command).

The privileges configuration component 610 can facilitate defining and/or setting rules and regulations regarding remote control of the vehicle functions/applications by one or more auxiliary devices. For example, the privileges configuration component 610 can facilitate defining and/or setting rules (e.g., referred to herein as remote control management information) regarding authorized auxiliary devices and/or users (e.g., user accounts) allowed to connect to the vehicle or otherwise employ remote-control application 600 (and the like) to remotely control the vehicle, information defining specific vehicle functions and/or applications the respective authorized auxiliary devices and/or users can access/control, and information defining contextual conditions and/scenarios that control timing of enablement/disablement of specific vehicle functions/applications. In this regard, the privileges configuration component 610 can allow one or more authorized entities, such as the driver of the vehicle, an owner of the vehicle, an agent of the driver, etc., to provide input defining the various types of remote control management information discussed herein.

In some embodiments, the privileges configuration component 610 can be restricted to receiving input defining remote-control management information (e.g., authorized devices/users, usages privileges, etc.) only via directly interfacing with the primary vehicle touchscreen 102. With the embodiments, based on requiring a user to define remote-control management information by directly interfacing with the primary vehicle touchscreen, the control management component 606 can minimize the ability of unauthorized users (remote users that are not inside the vehicle) to gain access to remotely control the vehicle features and functionalities. In other embodiments, one or more instances of the remote-control application 600 and/or users of the remote-control application 600 can be granted with authority to remotely mange usage rights and privileges of other instances of the remote-control application 600 executed by one or more (other) auxiliary devices 124. For example, one or more users/auxiliary devices can include remote management component 604 that can allow the user to access and interface with the privileges configuration component 610 using the remote-control application 600. In this regard, if a specific auxiliary device and/or user account has been provided with authority to remotely define and/or modify the remote control management information (e.g., to define a list of one or more authorized auxiliary devices/users, define what remote vehicle functions and/or applications they can access, apply contextual restrictions regarding when certain vehicle functions/applications can be accessed, etc.), the remote-control application 600 can activate the remote management component 604. For example, based on a determination (e.g., by the control management component 606) that an auxiliary device or a user of the auxiliary device is authorized to remotely configure the remote-control management information, the control management component 606 can direct the remote-control application 600 to activate the remote-management component. Using the (activated) remote management component 604, the user can then remotely interface with the privileges configuration component 610 to define and/or modify the remote-control management information applied by the control management component 606.

Figure 7:
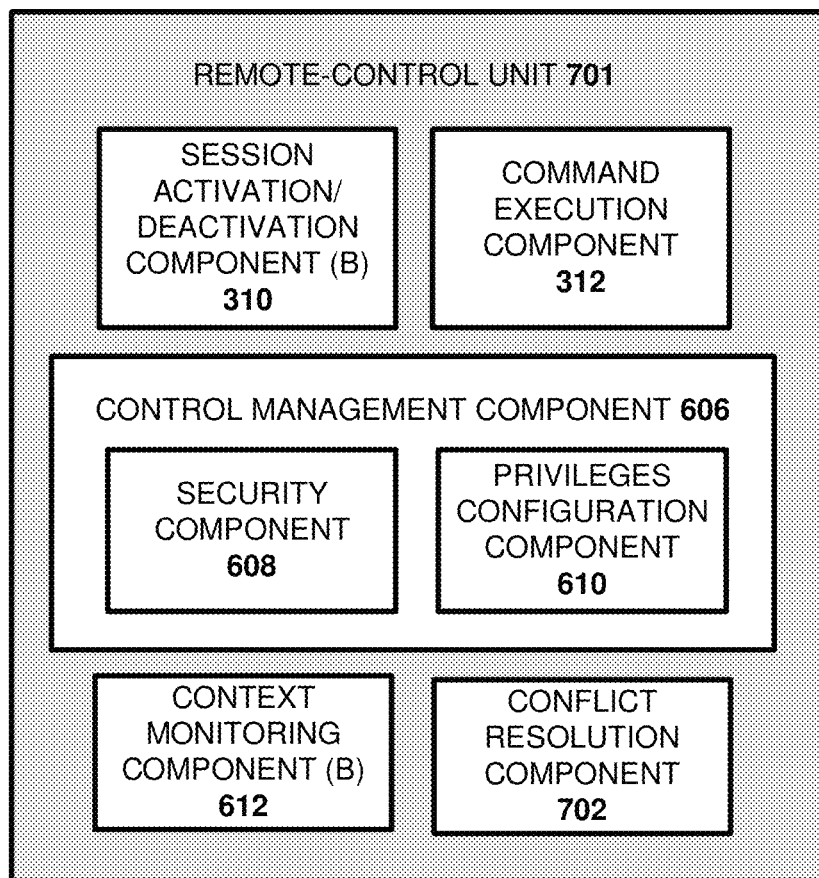
FIG. 7 illustrates a block diagram of another example, non-limiting remote-control unit that facilitates managing access to and control of vehicle functions and applications by an auxiliary device in accordance with one or more embodiments described herein.

FIG. 7 illustrates a block diagram of an example, non-limiting, remote-control unit 701 that facilitates resolving conflicting commands received from two or more devices in association with enabling remote control of vehicle functions and applications in accordance with one or more embodiments described herein. Remote-control unit 701 comprises same or similar components as remote-control unit 601 with the addition of conflict resolution component 702. Repetitive description of like elements employed in respective embodiments is omitted for sake of brevity.

In some implementations, two or more auxiliary devices can be connected to the vehicle computing device 112 at the same time, thereby enabling simultaneous or concurrent remote control of the vehicle functions and/or applications by two or more devices. In other implementations, an auxiliary device associated with a passenger (or another entity) can have an active remote-control session with a vehicle system while the vehicle functions and/or applications can also be controlled by another passenger (e.g., the driver or a front seat passenger) employing the primary vehicle touchscreen. With either of these implementations, scenarios can arise in which the remote-control unit 108 receives conflicting commands from two or more different devices at or near the same time. Thus, in one or more embodiments, the remote-control unit 108 can include a conflict resolution component 702 component that resolves conflicting control commands to control a function or application received from two or more devices.

In some embodiments, the conflict resolution component 702 can employ a defined conflict resolution protocol that identifies/determines how to resolve conflicting commands received to control vehicle functions and/or applications. The defined conflict resolution protocol can for example be provided by a system administrator or configured by an authorized entity, such as the driver of the vehicle. For example, in some implementations, the defined conflict resolution protocol can define a hierarchy for control command sources such that commands received from a higher ranked source override a lower ranked source (e.g., primary vehicle touchscreen 102 commands override all other devices, auxiliary device/user 1 commands override auxiliary device/user 2, and so on). The source hierarchy can apply to all vehicle functions and/or applications, or a specific source hierarchy can be assigned to respective vehicle functions and/or applications (e.g., for application A auxiliary device/user 1 commands override auxiliary device/user 2, for application B, auxiliary device/user 2 commands override auxiliary device/user 3, and so on and so on).

In other embodiments in which control commands are received from two or more devices with a distinguishable time difference, even if the time difference is minimal (e.g., less than a one second difference), the conflict resolution component 702 can employ a first in time protocol, wherein the command received first wins. In some implementations of the first in time protocol, depending on the specific vehicle function or application, the conflict resolution component 702 can also apply a minimum threshold period before accepting and applying a new command to control the same vehicle function or application received from a different device. For example, assume a first auxiliary device and a second auxiliary device issue commands to change the vehicle music source to different sources near the same time and the first auxiliary device wins based on the first in time protocol. With this example, if the second auxiliary device attempts to issue an additional control command requesting again to change the music source within a defined period of time after the vehicle applied the control command of the first auxiliary device, the conflict resolution component 702 can direct the command execution component 312 to reject the additional control command.

Figure 8:
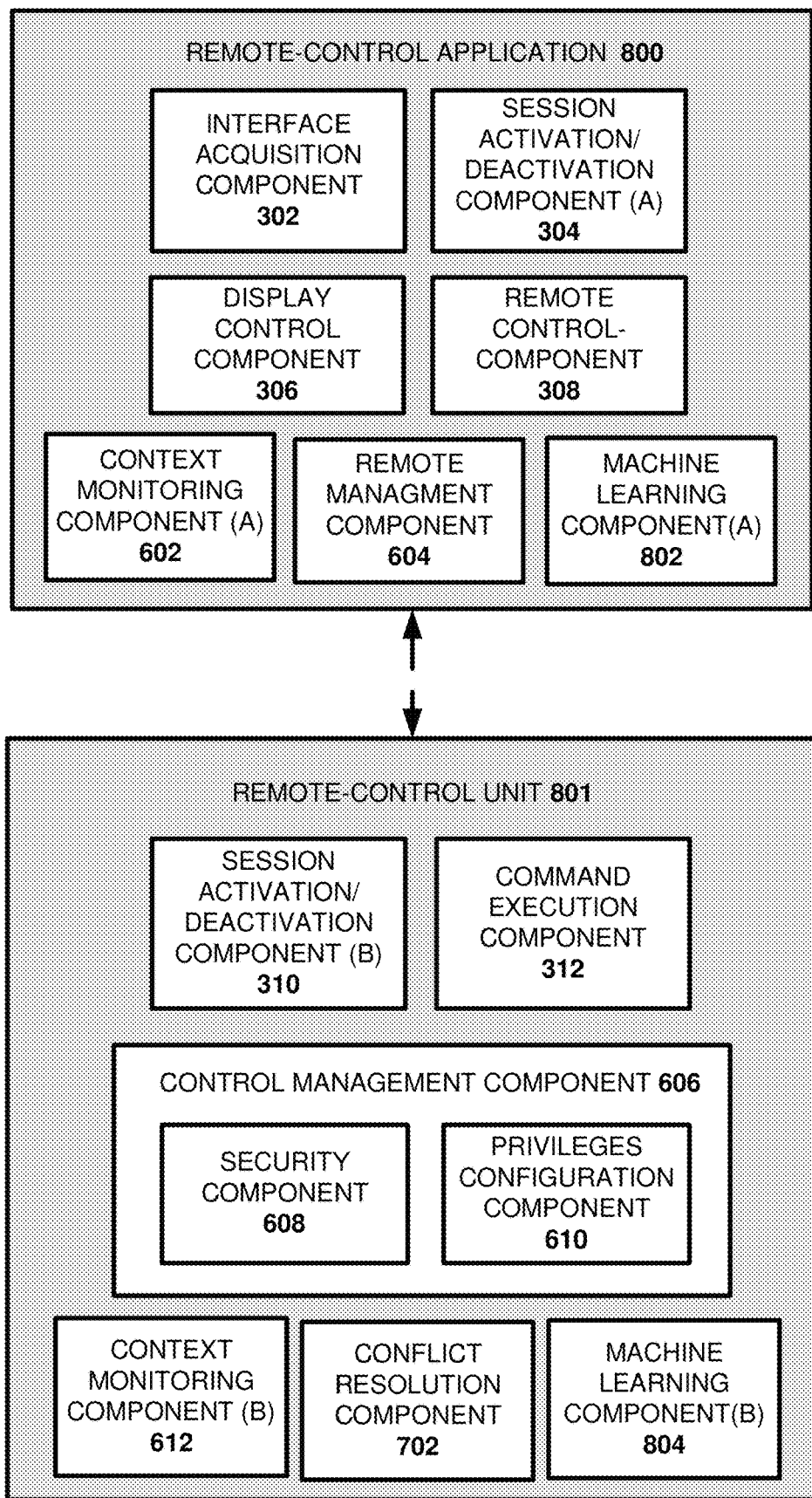
FIG. 8 illustrates a block diagram of an example, non-limiting remote-control application and remote-control unit that can employs machine learning and/or artificial intelligence to facilitate remotely controlling vehicle functions and applications accessed by touch controls displayed on a vehicle touchscreen in accordance with one or more embodiments described herein.

FIG. 8 illustrates a block diagram of an example, non-limiting, remote-control application 800 and remote-control unit 801 that employs machine learning and/or artificial intelligence to facilitate remotely controlling vehicle functions and applications accessed by touch controls displayed on a vehicle touchscreen in accordance with one or more embodiments described herein. Remote-control application 800 includes same or similar features and functionalities as remote-control application 600 with the addition of machine learning component (A) 802. Likewise, remote-control unit 801 include same or similar features and functionalities as remote-control unit 701 with the addition of machine learning component (B) 804. Repetitive description of like elements employed in respective embodiments is omitted for sake of brevity.

The machine learning component (A) 802 and machine learning component (B) 804 can employ artificial intelligence and one or more machine learning techniques to facilitate various features and functionalities of the remote-control application 800 and the remote-control unit 801, respectively. For example, in some embodiments, the machine learning component (B) 804 can learn information regarding devices and/or users that are authorized or unauthorized to establish a remote-control session with a vehicle. The session activation/deactivation component 310 (B) can further employ the authorized information to automatically authorize or deny authorization of a remote-control session between an auxiliary device/user and the vehicle computing device 112. The machine learning component 802 (A) and/or machine learning component (B) 804 can further learn information regarding user preferences (e.g., specific to a driver of the vehicle, specific to an owner of the vehicle, specific to an administrator of the remote control functionality, etc.) regarding what applications and/or functions of a vehicle specific auxiliary devices and/or users can access and when (e.g., in different contextual scenarios). In some implementations the display control component 306 can further apply this learned privilege information to automatically select vehicle applications/functions to include in a GUI rendered at an auxiliary device, and/or the remote-control component 308 can employ this learned privilege information to automatically activate and deactivate certain remote-control functionality at an auxiliary device 124. In other implementations, the privileges configuration component 610 and/or the remote management component 604 can employ this learned privilege information to automatically define the control management information for application by the control management component 606.

The machine learning component (A) 802 can also learn behavior of a user of an auxiliary device regarding usage of the remote-control application 800, and more particularly, the GUI provided by the display control component 306 of the remote-control application 800, to control vehicle features, functions, and/or applications in association with different contexts of the vehicle and/or the auxiliary device. For example, the machine learning component (B) 802 can learn usage patterns regarding what vehicle functions and/or applications the user accesses and remotely controls, frequency of use, order of use and the like. The display control component 306 can further dynamically modify or adapt the graphical controls of the vehicle GUI displayed on the primary vehicle touchscreen and/or an auxiliary device based on the learned usage behavior. For example, the display control component 306 can tailor the specific graphical controls for corresponding vehicle features, functions and/or applications included in respective pages of the vehicle GUI based on the learned preferences of the user in different contexts. The machine learning component (B) 804 can also learn user preferences regarding how to resolve conflicting commands received from two or more devices. The conflict resolution component 702 can further apply the learned conflict resolution information to automatically determine how to resolve conflicts received from two or more devices.

In this regard, machine learning component (A) 802 and machine learning component (B) 804 can perform classifications, correlations, inferences and/or expressions associated with principles of artificial intelligence. For instance, machine learning component (A) 802 and machine learning component (B) 804 can employ an automatic classification system and/or an automatic classification. In one example, machine learning component (A) 802 and machine learning component (B) 804 can employ a probabilistic and/or statistical-based analysis (e.g., factoring into the analysis utilities and costs) to learn and/or generate inferences. The machine learning component (A) 802 and machine learning component (B) 804 can employ any suitable machine-learning based techniques, statistical-based techniques and/or probabilistic-based techniques. For example, the machine learning component 802 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, machine learning component (A) 802 and machine learning component (B) 804 can perform a set of machine learning computations. For example, machine learning component (A) 802 and machine learning component (B) 804 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 9:
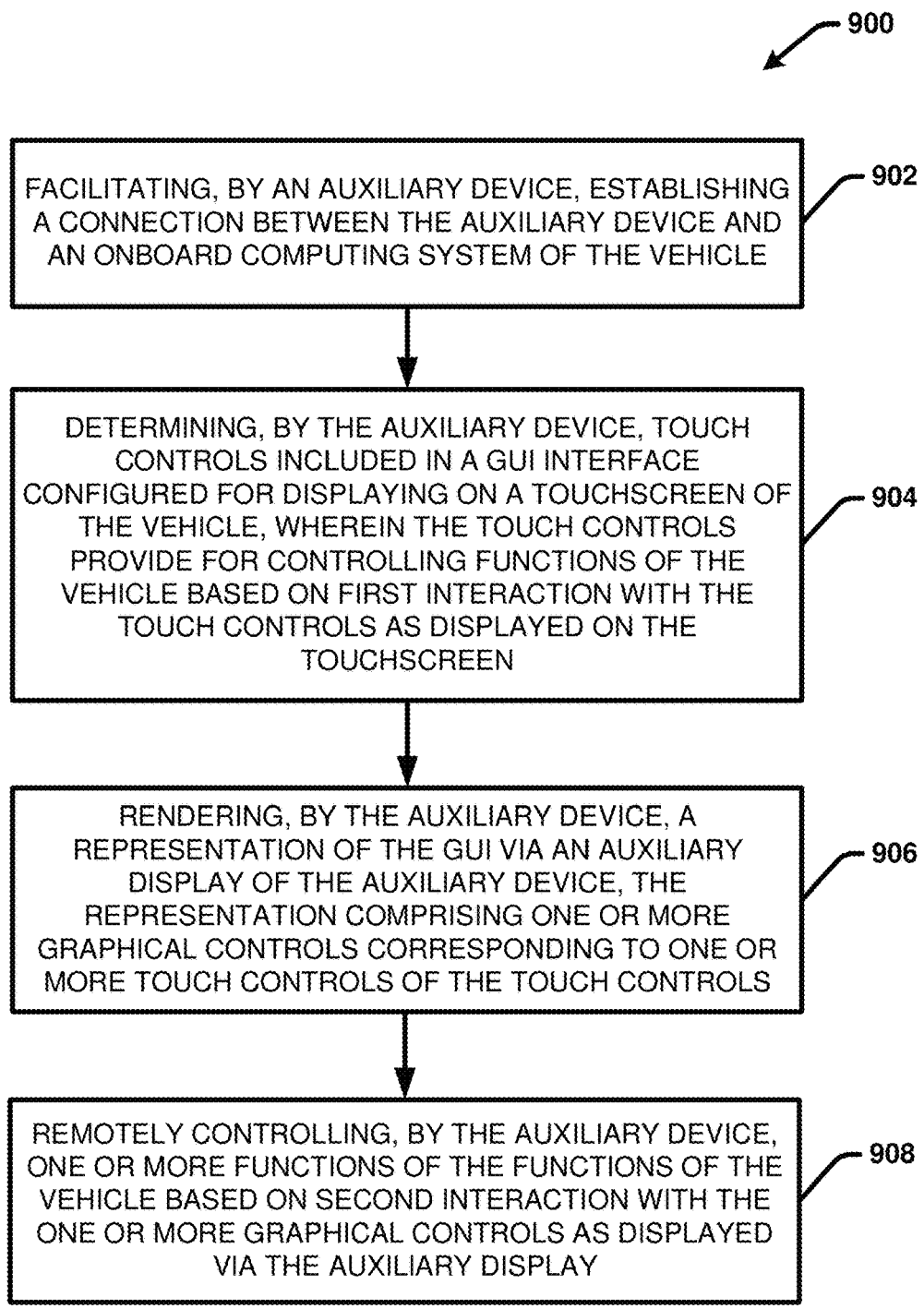
FIG. 9 provides a high-level flow diagram of an example computer implemented method to remotely control vehicle functions and/or applications in accordance with one or more embodiments described herein.

FIG. 9 provides a high-level flow diagram of an example computer implemented method 900 to remotely control vehicle functions and/or applications in accordance with one or more embodiments described herein. Method 900 provides for remotely controlling functions of a vehicle by an auxiliary device (e.g., auxiliary device 124), the method comprising employing a processor to execute computer executable components stored in at least one memory (e.g., memory 210) to perform the following acts. For example, method 900 provides an example method that can be executed by an auxiliary device 124 using a remote-control application (e.g., remote-control application 216, remote-control application 600, remote-control application 800 and the like). Repetitive description of like elements employed in respective embodiments is omitted for sake of brevity.

At 902, an auxiliary device (e.g., auxiliary device 124) can facilitate establishing a connection between the auxiliary device and an onboard computing system (e.g., onboard vehicle system 101) of the vehicle (e.g., using session activation/deactivation component (A) 302 and/or communication unit 206). At 904, the auxiliary device can determine (e.g., using interface acquisition component 302) touch controls included in a GUI configured for displaying on a touchscreen (e.g., primary vehicle touchscreen 102) of the vehicle, wherein the touch controls provide for controlling functions of the vehicle based on first interaction with the touch controls as displayed on the touchscreen. At 906, the auxiliary device can render (e.g., using display control component 306), a representation of the GUI via an auxiliary display of the auxiliary device (e.g., display 202), the representation comprising one or more graphical controls corresponding to one or more touch controls of the touch controls. At 908, the auxiliary device can remotely control one or more functions of the functions of the vehicle based on second interaction with the one or more graphical controls as displayed via the auxiliary display (e.g., using remote-control component 308).

Figure 10:
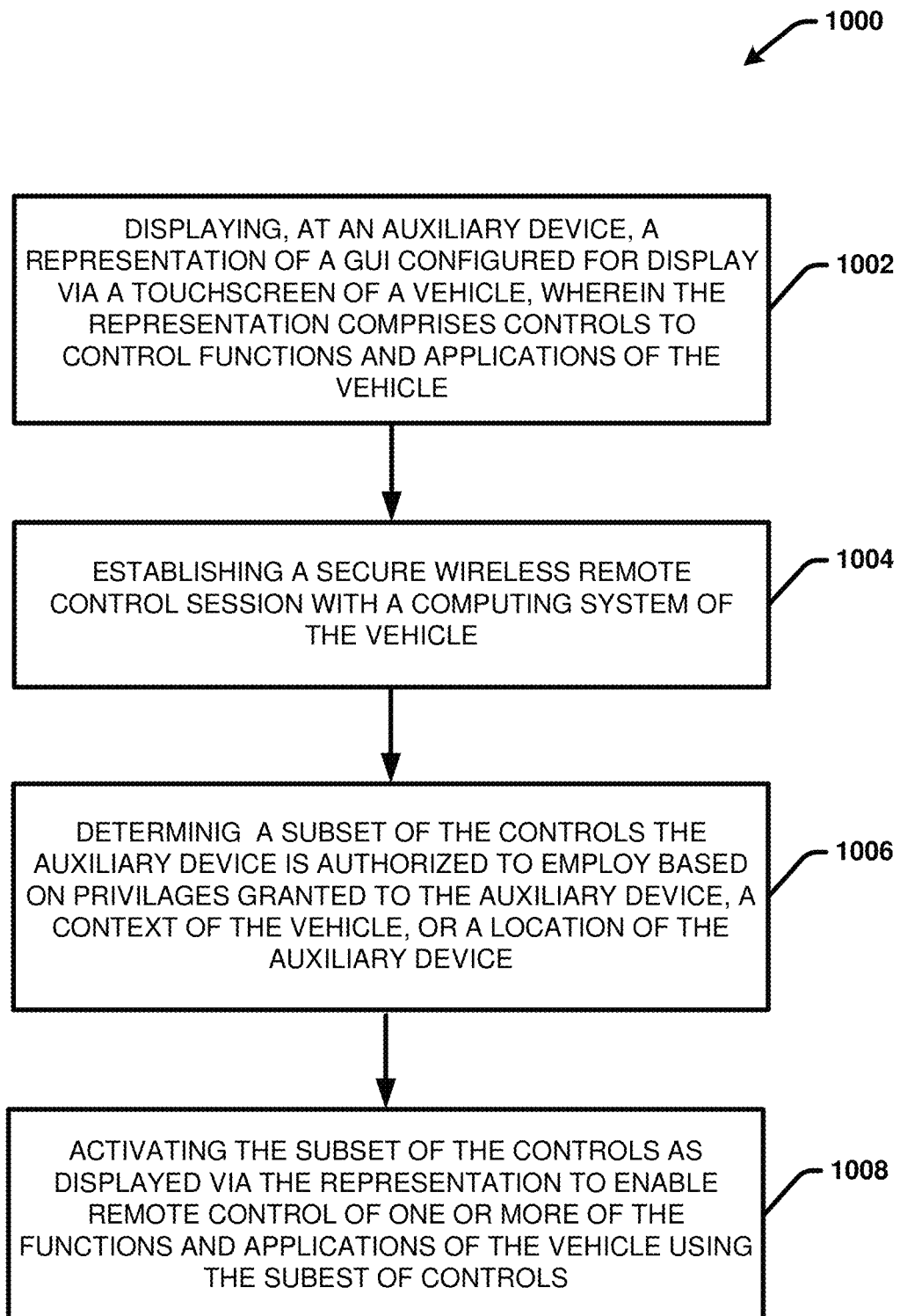
FIG. 10 provides a high-level flow diagram of another example computer implemented method to remotely control vehicle functions and/or applications in accordance with one or more embodiments described herein.

FIG. 10 provides a high-level flow diagram of another example computer implemented method 1000 to remotely control vehicle functions and/or applications in accordance with one or more embodiments described herein. Method 1000 provides for remotely controlling functions of a vehicle by an auxiliary device (e.g., auxiliary device 124), the method comprising employing a processor to execute computer executable components stored in at least one memory (e.g., memory 210) to perform the following acts. For example, method 900 provides an example method that can be executed by an auxiliary device 124 using a remote-control application (e.g., remote-control application 216, remote-control application 600, remote-control application 800 and the like). Repetitive description of like elements employed in respective embodiments is omitted for sake of brevity.

At 1002, an auxiliary device (e.g., auxiliary device 124) can display (e.g., via display control component 306), at the auxiliary device, a representation of a GUI configured for display via a touchscreen of a vehicle, wherein the representation comprises controls to control functions and applications of the vehicle. At 1004, the auxiliary device can establish a secure wireless remote-control session with a computing system of the vehicle (e.g., using session activation/deactivation component (A) 304 and/or communication unit 206). At 1006, the auxiliary device can determine a subset of the controls the auxiliary device is authorized to employ based on privileges granted to the auxiliary device, a context of the vehicle, or a location of the auxiliary device (e.g., by the display control component 306 and/or the remote-control component 308 based on control management information provided by the remote-control unit 601). At 1008, the auxiliary device can activate a subset of the controls as displayed via the representation to enable remote controls of one or more of the functions and applications of the vehicle using the subset of controls (e.g., via remote-control component 308).

Figure 11:
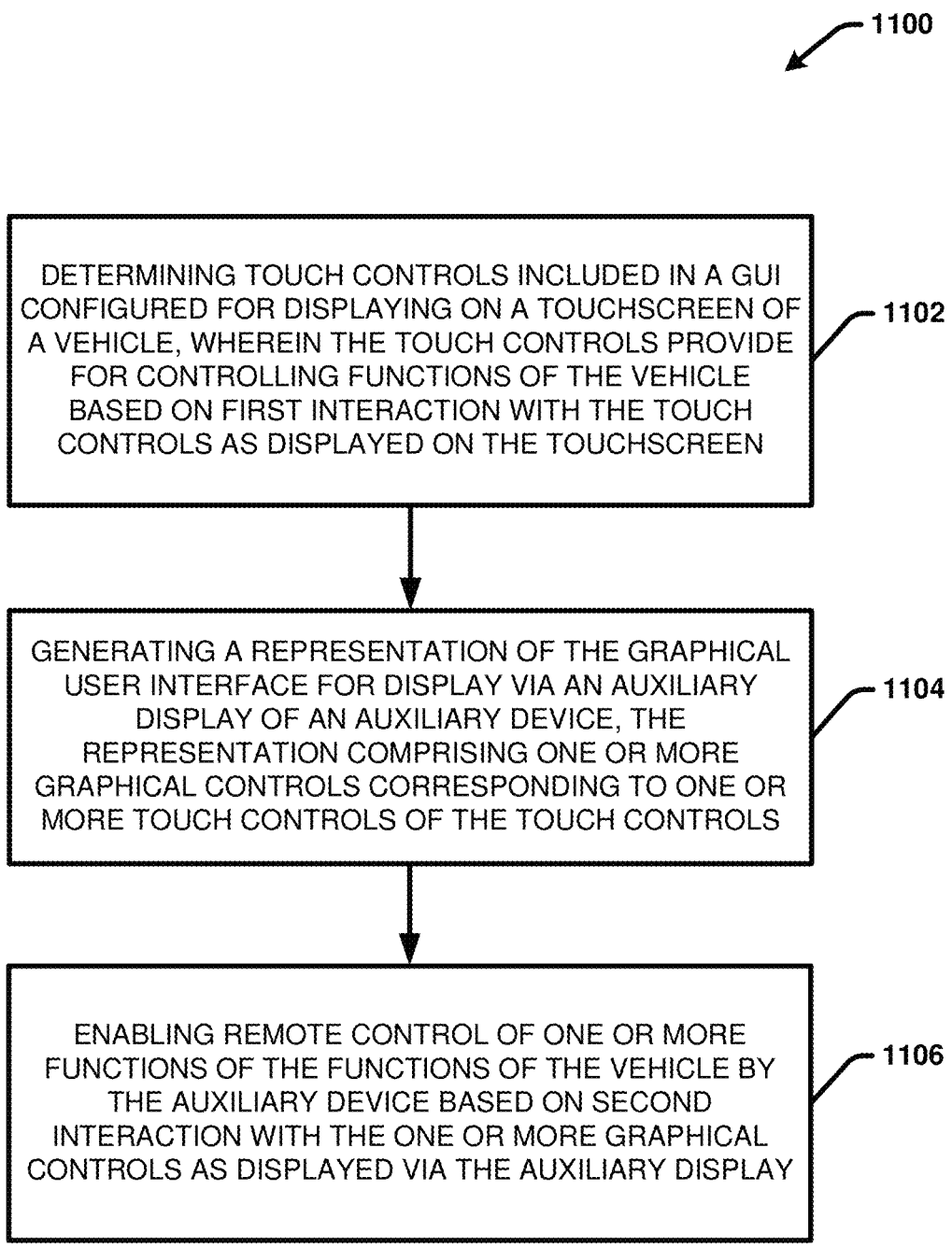
FIG. 11 provides a high-level flow diagram of another example computer implemented method to remotely control vehicle functions and/or applications in accordance with one or more embodiments described herein.

FIG. 11 provides a high-level flow diagram of another example computer implemented method 1100 to remotely control vehicle functions and/or applications in accordance with one or more embodiments described herein. Method 1100 provides for remotely controlling functions of a vehicle by an auxiliary device (e.g., auxiliary device 124), the method comprising employing a processor to execute computer executable components stored in at least one memory (e.g., memory 210) to perform the following acts. For example, method 900 provides an example method that can be executed by an auxiliary device 124 using a remote-control application (e.g., remote-control application 216, remote control application 600, remote-control application 800 and the like). Repetitive description of like elements employed in respective embodiments is omitted for sake of brevity.

At 1102, a remote-control application (e.g., remote-control application 800) can determine (e.g., using interface acquisition component 302) touch controls included in a GUI configured for displaying on a touchscreen of a vehicle, wherein the touch controls provide for controlling functions of the vehicle based on first interaction with the touch controls as displayed on the touchscreen. At 1104, the remote-control application can generate a representation of the GUI for display via an auxiliary display of an auxiliary device, the representation comprising one or more graphical controls corresponding to one or more touch controls of the touch controls (e.g., using display control component 306). At 1106, the remote-control application can enable remote control of one or more functions of the functions of the vehicle by the auxiliary device based on second interaction with the one or more graphical controls as displayed via the auxiliary display (e.g., via the remote-control component 308).

Figure 12:
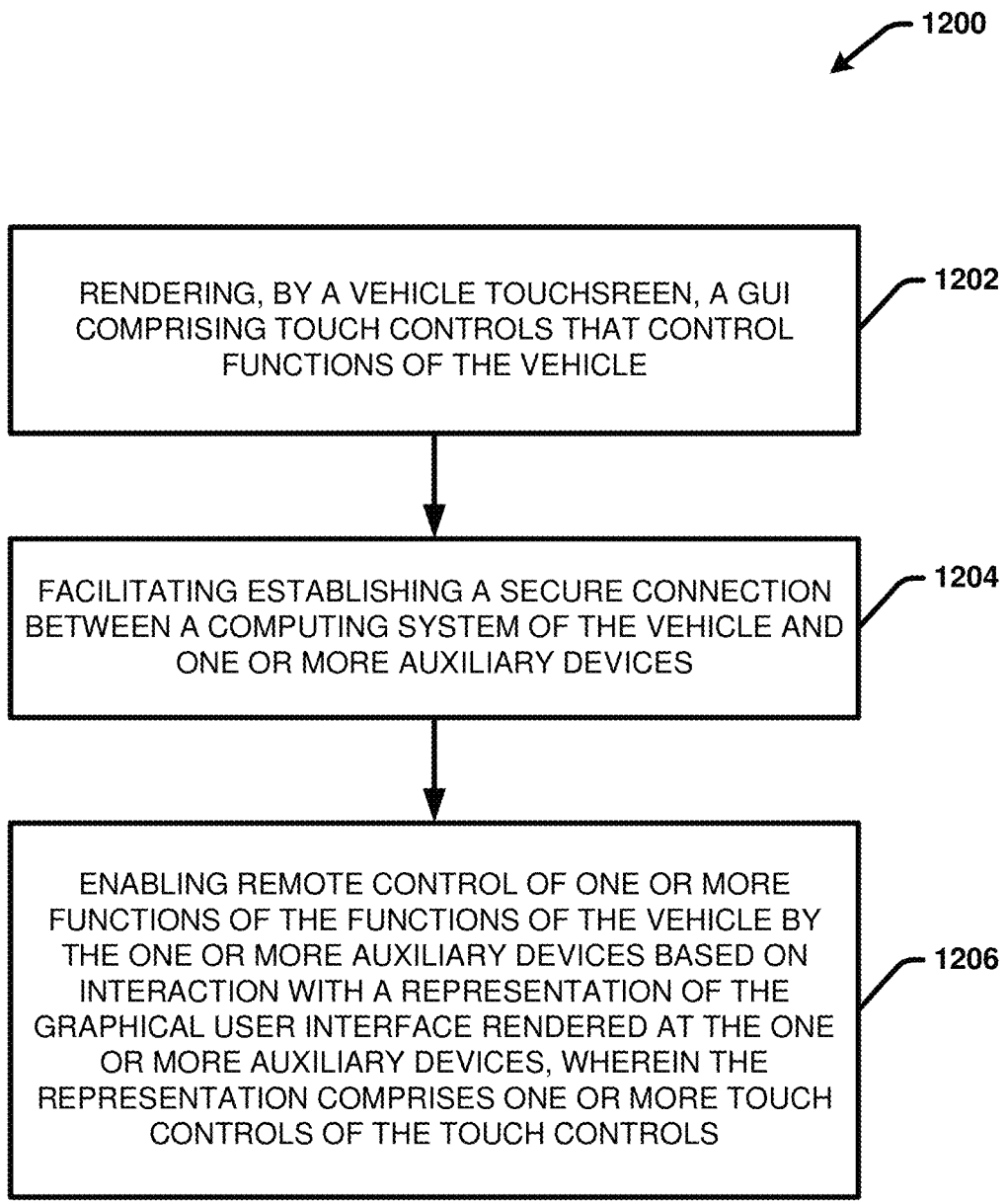
FIG. 12 provides a high-level flow diagram of another example computer implemented method to remotely control vehicle functions and/or applications in accordance with one or more embodiments described herein.

FIG. 12 provides a high-level flow diagram of another example computer implemented method 1200 to remotely control vehicle functions and/or applications in accordance with one or more embodiments described herein. Method 1200 provides an example method that can be executed by an onboard vehicle system 101 using a remote-control unit (e.g., remote-control unit 108, remote-control unit 601, remote-control unit 701, remote-control unit 801, and the like). Repetitive description of like elements employed in respective embodiments is omitted for sake of brevity.

At 1202, the onboard vehicle system can render a touchscreen that displays a GUI comprising touch controls that control functions of the vehicle (e.g., via primary vehicle touchscreen 102). At 1204, the onboard vehicle system can facilitate establishing a secure connection between the system and one or more auxiliary devices (e.g., using communication unit 116, and/or session activation/deactivation component (B) 310. At 1204, the onboard vehicle system can then enable, based on establishment of the secure connection, remote control of one or more functions of the functions of the vehicle by the one or more auxiliary devices based on interaction with a representation of the GUI interface rendered at the one or more auxiliary devices, wherein the representation comprises one or more touch controls of the touch controls (e.g., using remote-control unit 108, command execution component 312, and/or control management component 606).

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
    a processor that executes computer executable components stored in at least one memory;
        a session activation component that facilitates establishing a secure connection between a vehicle interface system of a vehicle and one or more auxiliary devices that are not part of the vehicle, wherein the vehicle interface system comprises a graphical user interface including touch controls; and
        a remote-control component that enables, based on establishment of the secure connection, remote control of one or more functions of the vehicle by the one or more auxiliary devices based on interaction with respective representations of the graphical user interface rendered at the one or more auxiliary devices, wherein the respective representations of the graphical user interface comprise respective subsets of the touch controls selected based at least upon respective first parameters associated with the one or more auxiliary devices, and the respective first parameters comprise at least one of a physical feature of the auxiliary device, a functionality of the auxiliary device, or a context of the auxiliary device.

2. The system of claim 1, wherein the subset of touch controls is selected further based at least upon a second parameter associated with the vehicle, wherein the second parameter comprises at least one of a physical feature of the vehicle, a functionality of the vehicle, or a context of the vehicle.

3. The system of claim 1, further comprising:
a privileges configuration component of the remote-control component that facilitates defining usage privileges for enabling the remote control of the one or more functions by the one or more auxiliary devices.

4. The system of claim 1, further comprising:
a control management component of the remote-control unit that controls activating and deactivating remote control of the one or more vehicle functions by one or more auxiliary devices.

5. The system of claim 1, wherein the one or more auxiliary devices comprise at least two auxiliary devices, and wherein the system further comprises:
a conflict resolution component of the remote-control component that resolves conflicting control commands for remotely controlling a function of the one or more functions, the conflicting control commands being received from the at least two auxiliary devices at or near a same time.

6. An auxiliary device that facilitates remotely controlling functions of a vehicle, comprising:
a display;
a processor that executes computer executable components stored in at least one memory;
a session activation component that facilitates establishing a secure connection between the device and an onboard computing system of the vehicle, wherein the device is not integrated into the vehicle;
an interface acquisition component that determines touch controls of a graphical user interface configured for displaying on a touchscreen of the vehicle, wherein the touch controls provide for controlling functions of the vehicle based on interaction with the touch controls as displayed on the touchscreen;
a display control component that displays a representation of the graphical user interface via the display, wherein the representation of the graphical user interface comprises a subset of the touch controls selected based at least upon a first parameter associated with the auxiliary device, wherein the first parameter comprises at least one of a physical feature of the auxiliary device, a functionality of the auxiliary device, or a context of the auxiliary device; and
a remote-control component that provides for remotely controlling one or more functions of the vehicle with the subset of touch controls.

7. The auxiliary device of claim 6, wherein the subset of touch controls is selected further based at least upon a second parameter associated with the vehicle.

8. The auxiliary device of claim 7, wherein the second parameter comprises at least one of a physical feature of the vehicle, a functionality of the vehicle, or a context of the vehicle.

9. The auxiliary device of claim 6, wherein the connection comprises a wireless connection and wherein the remote-control component enables the remote control based on establishment of the connection between the auxiliary device and the onboard computing system.

10. The auxiliary device of claim 6, wherein the onboard computing system comprises a remote-control unit that controls execution of the one or more functions and wherein the remote-control component directs the remote-control unit to execute the one or more functions in response to the second interaction with the subset of the touch controls as displayed via the display.

11. The auxiliary device of claim 6, wherein the display control component selects the subset of the touch controls further based on usage privileges granted to the auxiliary device or a user of the auxiliary device.

12. The auxiliary device of claim 6, wherein the display control component selects the subset of the touch controls further based on a preference of an owner of the vehicle.

13. The auxiliary device of claim 6, further comprising:
a machine learning component that learns behavior of a user of the auxiliary device in association with usage of the representation of the graphical user interface to remotely control the one or more function and modifies the subset of the touch controls based on the learned behavior.

14. A computer-implemented method for remotely controlling functions of a vehicle by an auxiliary device, the method comprising employing a processor to execute computer executable components stored in at least one memory to perform the following acts:
facilitating establishing a connection between the auxiliary device and an onboard computing system of the vehicle, wherein the auxiliary device is not part of the vehicle;
determining touch controls included in a graphical user interface configured for displaying on a touchscreen of the vehicle, wherein the touch controls provide for controlling functions of the vehicle based on first interaction with the touch controls as displayed on the touchscreen;
rendering a representation of the graphical user interface via an auxiliary display of the auxiliary device, the representation comprising a subset of the touch controls selected based at least upon a first parameter associated with the auxiliary device, wherein the first parameter comprises at least one of a physical feature of the auxiliary device, a functionality of the auxiliary device, or a context of the auxiliary device; and
remotely controlling one or more functions of the functions of the vehicle based on second interaction with the subset of the touch controls as displayed via the auxiliary display.

15. The method of claim 14, wherein the subset of touch controls is selected further based at least upon a second parameter associated with the vehicle.

16. The method of claim 14, wherein the second parameter comprises at least one of a physical feature of the vehicle, a functionality of the vehicle, or a context of the vehicle.

17. The method of claim 14, wherein the onboard computing system comprises a remote-control unit that controls execution of the one or more functions, and wherein the remotely controlling comprises directing, by the auxiliary device, the remote-control unit to execute the one or more functions in response to the second interaction with the subset of the touch controls as displayed via the auxiliary display.

18. A computer program product that facilitates remotely controlling functions of a vehicle, the computer program product comprising a non-transitory computer readable medium having program instructions embodied therewith, the program instructions executable by a processor to cause the processor to:
determine touch controls included in a graphical user interface configured for displaying on a touchscreen of the vehicle, wherein the touch controls provide for controlling the functions of the vehicle based on first interaction with the touch controls as displayed on the touchscreen;

generate a representation of the graphical user interface for display via an auxiliary display of an auxiliary device that is not part of the vehicle, the representation comprising a subset of the touch controls selected based at least upon a first parameter associated with the auxiliary device, wherein the first parameter comprises at least one of a physical feature of the auxiliary device, a functionality of the auxiliary device, or a context of the auxiliary device; and enable remote control of one or more functions of the functions of the vehicle by the auxiliary device based on second interaction with the subset of the touch controls as displayed via the auxiliary display.

19. The computer program product of claim 18, wherein the subset of touch controls is selected further based at least upon a second parameter associated with the vehicle.

20. The computer program product of claim 19, wherein the second parameter comprises at least one of a physical feature of the vehicle, a functionality of the vehicle, or a context of the vehicle.

21. The computer program product of claim 18, wherein the onboard computing system comprises a remote-control unit that controls execution of the one or more functions, and wherein the program instructions cause the processing unit to enable the remote control by directing the auxiliary device to issue control commands that cause the remote-control unit to execute the one or more functions in response to the second interaction with the subset of the touch controls as displayed via the auxiliary display.

22. A computer-implemented method for remotely controlling functions of a vehicle, the method comprising employing a processor to execute computer executable components of a remote-control application stored in at least one memory to perform the following acts:

determining touch controls included in a graphical user interface configured for displaying on a touchscreen of the vehicle, wherein the touch controls provide for controlling functions of the vehicle based on first interaction with the touch controls as displayed on the touchscreen;

generating a representation of the graphical user interface for display via an auxiliary display of the auxiliary device that is not part of the vehicle, the representation comprising a subset of the touch controls selected based at least upon a first parameter associated with the auxiliary device, wherein the first parameter comprises at least one of a physical feature of the auxiliary device, a functionality of the auxiliary device, or a context of the auxiliary device; and enabling remote control of one or more functions of the functions of the vehicle by the auxiliary device based on second interaction with the subset of the touch controls as displayed via the auxiliary display.

23. The method of claim 22, wherein the subset of touch controls is selected further based at least upon a second parameter associated with the vehicle.

24. The method of claim 23, wherein the second parameter comprises at least one of a physical feature of the vehicle, a functionality of the vehicle, or a context of the vehicle.

25. The method of claim 22, wherein the onboard computing system comprises a remote-control unit that controls execution of the one or more functions, and wherein the enabling comprises directing the auxiliary device to issue control commands that cause the remote-control unit to execute the one or more functions in response to the second interaction with the subset of the touch controls as displayed via the auxiliary display.

* * * * *